United States Patent
Szoke-Sieswerda et al.

(10) Patent No.: US 12,006,141 B2
(45) Date of Patent: Jun. 11, 2024

(54) SYSTEMS AND METHODS FOR DETECTING WASTE RECEPTACLES USING CONVOLUTIONAL NEURAL NETWORKS

(71) Applicant: McNeilus Truck and Manufacturing, Inc., Dodge Center, MN (US)

(72) Inventors: Justin Szoke-Sieswerda, London (CA); Kenneth Alexander McIsaac, St. Mary's (CA); Leo Van Kampen, Conestogo (CA)

(73) Assignee: McNeilus Truck and Manufacturing, Inc., Dodge Center, MN (US)

( * ) Notice: Subject to any disclaimer, the term of this patent is extended or adjusted under 35 U.S.C. 154(b) by 0 days.

(21) Appl. No.: 17/973,411

(22) Filed: Oct. 25, 2022

(65) Prior Publication Data

US 2023/0046145 A1    Feb. 16, 2023

Related U.S. Application Data

(63) Continuation of application No. 16/758,834, filed as application No. PCT/CA2018/051312 on Oct. 18, 2018, now Pat. No. 11,527,072.

(Continued)

(51) Int. Cl.
*G06V 20/56* (2022.01)
*B25J 9/16* (2006.01)
(Continued)

(52) U.S. Cl.
CPC .............. *B65F 3/04* (2013.01); *B25J 9/1697* (2013.01); *B25J 19/023* (2013.01); *B65F 3/041* (2013.01);
(Continued)

(58) Field of Classification Search
CPC ...... B65F 3/04; B65F 3/041; B65F 2003/023; B65F 2210/138; B65F 3/001;
(Continued)

(56) References Cited

U.S. PATENT DOCUMENTS

| 5,215,423 A | 6/1993 | Schulte-Hinsken et al. |
| 9,403,278 B1 | 8/2016 | Van Kampen et al. |

(Continued)

FOREIGN PATENT DOCUMENTS

| CN | 101684008 A | 3/2010 | |
| CN | 107203808 | * 9/2017 | ............. G06N 3/063 |

(Continued)

OTHER PUBLICATIONS

Andrew G Howard et al: "MobileNets: Efficient Convolutional Neural Networks for Mobile Vision Applications".
(Continued)

*Primary Examiner* — Jerome Grant, II
(74) *Attorney, Agent, or Firm* — Foley & Lardner LLP

(57) ABSTRACT

Systems and methods for detecting a waste receptacle, the system including a camera for capturing an image, a convolutional neural network, and processor. The convolutional neural network can be trained for identifying target waste receptacles. The processor can be mounted on the waste-collection vehicle and in communication with the camera and the convolutional neural network configured for using the convolutional neural network. The processor can be configured for using the convolutional neural network to generate an object candidate based on the image; using the convolutional neural network to determine whether the object candidate corresponds to a target waste receptacle; and selecting an action based on whether the object candidate is acceptable.

23 Claims, 26 Drawing Sheets

Related U.S. Application Data

(60) Provisional application No. 62/576,393, filed on Oct. 24, 2017.

(51) Int. Cl.
| | | |
|---|---|---|
| *B25J 19/02* | (2006.01) | |
| *B65F 3/04* | (2006.01) | |
| *G06F 18/241* | (2023.01) | |
| *G06N 3/04* | (2023.01) | |
| *G06N 3/08* | (2023.01) | |
| *G06V 10/764* | (2022.01) | |
| *G06V 10/82* | (2022.01) | |
| *B65F 3/02* | (2006.01) | |

(52) U.S. Cl.
CPC .............. *G06F 18/241* (2023.01); *G06N 3/04* (2013.01); *G06N 3/08* (2013.01); *G06V 10/764* (2022.01); *G06V 10/82* (2022.01); *G06V 20/56* (2022.01); *B65F 2003/023* (2013.01); *B65F 2210/138* (2013.01)

(58) Field of Classification Search
CPC ..... B25J 9/1697; B25J 19/023; G06F 18/241; G06N 3/04; G06N 3/08; G06V 10/764; G06V 10/82; G06V 20/56; Y02W 90/00; G05B 13/027
USPC .......................................................... 700/223
See application file for complete search history.

(56) References Cited

U.S. PATENT DOCUMENTS

| | | |
|---|---|---|
| 10,101,486 B1 | 10/2018 | Palmer et al. |
| 11,151,447 B1 | 10/2021 | Chen et al. |
| 11,157,814 B2 * | 10/2021 | Howard ................. G06N 3/082 |
| 11,527,072 B2 | 12/2022 | Szoke-Sieswerda et al. |
| 2018/0137406 A1 * | 5/2018 | Howard ................... G06N 3/04 |
| 2018/0247405 A1 | 8/2018 | Kisilev et al. |
| 2019/0001489 A1 * | 1/2019 | Hudson ................. G06N 3/045 |
| 2020/0349498 A1 | 11/2020 | Brooks et al. |

FOREIGN PATENT DOCUMENTS

| | | | |
|---|---|---|---|
| CN | 113743404 A | 12/2021 | |
| DE | 4340773 | * 11/1993 | ........... G06K 7/1092 |

OTHER PUBLICATIONS

Office Action issued in connection with EP Appl. Ser. No. 18870210.4 dated Apr. 4, 2023.

Matias Valdenegro-Toro; Submerged Marine Debris Detecton with Autonomous Underwater Vehicles; 2016; IEEE.

Office Action issued in connection with Australian Appl. No. 2018355910 dated Aug. 29, 2023.

* cited by examiner

1100

Table 1. MobileNet Body Architecture

| Type / Stride | Filter Shape | Input Size |
|---|---|---|
| Conv / s2 | 3 x 3 x 3 x 32 | 224 x 224 x 3 |
| Conv dw / s1 | 3 x 3 x 32 dw | 112 x 112 x 32 |
| Conv / s1 | 1 x 1 x 32 x 64 | 112 x 112 x 32 |
| Conv dw / s2 | 3 x 3 x 64 dw | 112 x 112 x 64 |
| Conv / s1 | 1 x 1 x 64 x 128 | 56 x 56 x 64 |
| Conv dw / s1 | 3 x 3 x 128 dw | 56 x 56 x 128 |
| Conv / s1 | 1 x 1 x 128 x 128 | 56 x 56 x 128 |
| Conv dw / s2 | 3 x 3 x 128 dw | 56 x 56 x 128 |
| Conv / s1 | 1 x 1 x 128 x 256 | 28 x 28 x 128 |
| Conv dw / s1 | 3 x 3 x 256 dw | 28 x 28 x 256 |
| Conv / s1 | 1 x 1 x 256 x 256 | 28 x 28 x 256 |
| Conv dw / s2 | 3 x 3 x 256 dw | 28 x 28 x 256 |
| Conv / s1 | 1 x 1 x 256 x 512 | 14 x 14 x 256 |
| 5 x  Conv dw / s1 | 3 x 3 x 512 dw | 14 x 14 x 512 |
| Conv / s1 | 1 x 1 x 512 x 512 | 14 x 14 x 512 |
| Conv dw / s2 | 3 x 3 x 512 dw | 14 x 14 x 512 |
| Conv / s1 | 1 x 1 x 512 x 1024 | 7 x 7 x 512 |
| Conv dw / s2 | 3 x 3 x 1024 dw | 7 x 7 x 1024 |
| Conv / s1 | 1 x 1 x 1024 x 1024 | 7 x 7 x 1024 |
| Avg Pool / s1 | Pool 7 x 7 | 7 x 7 x 1024 |
| FC / s1 | 1024 x 1000 | 1 x 1 x 1024 |
| Softmax / s1 | Classifier | 1 x 1 x 1000 |

FIG. 11

SYSTEMS AND METHODS FOR DETECTING WASTE RECEPTACLES USING CONVOLUTIONAL NEURAL NETWORKS

CROSS-REFERENCE TO RELATED PATENT APPLICATIONS

This application is a continuation of U.S. patent application Ser. No. 16/758,834, filed on Apr. 23, 2020, which is a national stage entry of P.C.T. Application No. PCT/CA2018/051312, filed on Oct. 18, 2018, and also claims the benefit of U.S. Provisional Patent Application No. 62/576,393, filed on Oct. 24, 2017, the entire contents of which are all incorporated by reference herein.

TECHNICAL FIELD

The disclosure herein relates to waste-collection vehicles, and in particular, to systems and methods for detecting a waste receptacle.

BACKGROUND

Waste collection has become a service that people have come to rely on in their residences and in their places of work. Residential waste collection, conducted by a municipality, occurs on "garbage day", when residents place their waste receptacles at the curb for collection by a waste-collection vehicle. Waste collection in apartment and condominium buildings and commercial and industrial facilities occurs when a waste-collection vehicle collects waste from a dumpster.

Generally speaking, the process of waste collection comprises picking up a waste receptacle, moving it to the hopper or bin of a waste-collection vehicle, dumping the contents of the waste receptacle into the hopper or bin of the waste-collection vehicle, and then returning the waste receptacle to its original location.

The waste-collection process places demands on waste-collection operators, in order to achieve efficiencies in a competitive marketplace. These efficiencies can be found in terms of labor costs, waste-collection capacity, waste-collection speed, etc. Even minor savings in the time required to pick up a single waste receptacle can represent significant economic savings when realized over an entire waste-collection operation.

One area of interest with respect to improving collection speed (i.e. reducing waste-collection time) is the automation of waste-receptacle pick-up. Traditionally, a waste-collection vehicle would be operated by a team of at least two waste-collection personnel. One person would drive the waste-collection vehicle from one location to the next (e.g. from one house to the next), and then stop the waste-collection vehicle while the other person (or persons) would walk to the location of the waste receptacle, manually pick up the waste receptacle, carry it to the waste-collection vehicle, dump the contents of the waste receptacle into the waste-collection vehicle, and then return the waste receptacle to the place from where it was first picked up.

This process has been improved by the addition of a controllable mechanical arm mounted to the waste-collection vehicle. The arm is movable based on joystick operation of a human operator. As such, the waste-collection vehicle could be driven within close proximity of the waste receptacle, and the arm could be deployed through joystick control in order to grasp, lift, and dump the waste receptacle.

Further improvements on the arm system have included the automatic or computer-assisted recognition of a waste receptacle. U.S. Pat. No. 5,215,423 to Schulte-Hinsken discloses a camera system for determining the spatial position of five reflective marks that have been previously attached to a garbage can. Due to the properties and geometric pattern of the five reflected marks, the pattern of the reflected marks can be distinguished from the natural environment and therefore easily detected by the camera. However, Schulte-Hinsken fails to teach a solution for detecting an un-marked and textureless garbage can in a natural environment, which may contain highly textured elements, such as foliage.

U.S. Pat. No. 5,762,461 to Frölingsdorf discloses an apparatus for picking up a trash receptacle comprising a pickup arm that includes sensors within the head of the arm. Frölingsdorf discloses that an operator can use a joystick to direct an ultrasound transmitter/camera unit towards a container. In other words, the operator provides gross control of the arm using the joystick. When the arm has been moved by the operator into sufficiently-close proximity, a fine-positioning mode of the system is evoked, which uses the sensors to orient the head of the arm for a specific mechanical engagement with the container. Frölingsdorf relies on specific guide elements attached to a container in order to provide a specific mechanical interface with the pickup arm. As such, Frölingsdorf does not provide a means of identifying and locating various types of containers.

U.S. Pat. No. 9,403,278 to Van Kampen et al. discloses a system and method for detecting and picking up a waste receptacle. The system, which is mountable to a waste-collection vehicle, comprises a camera for capturing an image and a processor configured for verifying whether the captured image corresponds to a waste receptacle, and if so, calculating a location of the waste receptacle. The system further comprises an arm actuation module configured to automatically grasp the waste receptacle, lift, and dump the waste receptacle into the waste-collection vehicle in response to the calculated location of the waste receptacle. Van Kampen et al. relies on stored poses of the waste receptacle, that is the stored shape of the waste receptacle, for verifying whether the captured image corresponds to a waste receptacle. However, such detection is limited to waste receptacles having an orientation that matches one of the stored poses.

In addition, waste collection can implement multiple streams. A single waste-collection vehicle can collect contents from multiple waste receptacles—one for each of garbage, recycling, and compost (or organics). In order for the waste-collection vehicle to dump contents from the waste receptacles into the appropriate bin for that collection stream, it must be able to distinguish between the multiple waste receptacles. Multiple waste receptacles can use similarly shaped waste receptacles that differ in color or decals.

Accordingly, there is a need for systems and methods for detecting a waste receptacle that address the limitations found in the state of the art.

SUMMARY

According to one aspect, there is provided a system for detecting a waste receptacle. The system includes a camera for capturing an image, a convolutional neural network trained for identifying target waste receptacles, and a processor mounted on the waste-collection vehicle, in communication with the camera and the convolutional neural network.

The processor is configured for using the convolutional neural network to generate an object candidate based on the image; using the convolutional neural network to determine whether the object candidate corresponds to a target waste receptacle; and selecting an action based on whether the object candidate is acceptable.

According to some embodiments, the object candidate includes an object classification and bounding box definition. According to some embodiments, the object classification includes at least one of garbage, recycling, compost, and background.

According to some embodiments, the bounding box definition includes pixel coordinates, a bounding box width, and a bounding box height.

According to some embodiments, the use of the convolutional neural network to determine whether the object candidate is acceptable involves predicting a class confidence score; and if the class confidence score is greater than a pre-defined confidence threshold of acceptability, determining that the object candidate is acceptable; otherwise determining that the object candidate is not acceptable.

According to some embodiments, the convolutional neural network includes a plurality of depthwise separable convolution filters. According to some embodiments, the convolutional neural network includes a MobileNet architecture.

According to some embodiments, the convolutional neural network includes a meta-architecture for object classification and bounding box regression. According to some embodiments, the meta-architecture includes single shot detection. According to some embodiments, the meta-architecture includes four additional convolution layers.

According to some embodiments, the processor is further configured for selecting the action of picking up the waste receptacle if the object candidate is acceptable; and selecting the action of rejecting the object candidate if the object candidate is not acceptable. If the action of picking up the waste receptacle is selected, the processor is further configured for calculating a location of the waste receptacle. The arm-actuation module is configured for automatically moving the arm in response to the location of the waste receptacle.

According to some embodiments, the arm-actuation module is configured so that the moving the arm comprises grasping the waste receptacle. According to some embodiments, the moving the arm further involves lifting the waste receptacle and dumping contents of the waste receptacle into the waste-collection vehicle.

According to another aspect, there is provided a method for detecting a waste receptacle. The method involves capturing an image with a camera, using a convolutional neural network to generate an object candidate based on the image, determining whether the object candidate corresponds to a target waste receptacle, and selecting an action based on whether the object candidate is acceptable.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 11 is a table showing a full network structure for the MobileNet architecture;

Figure 1:
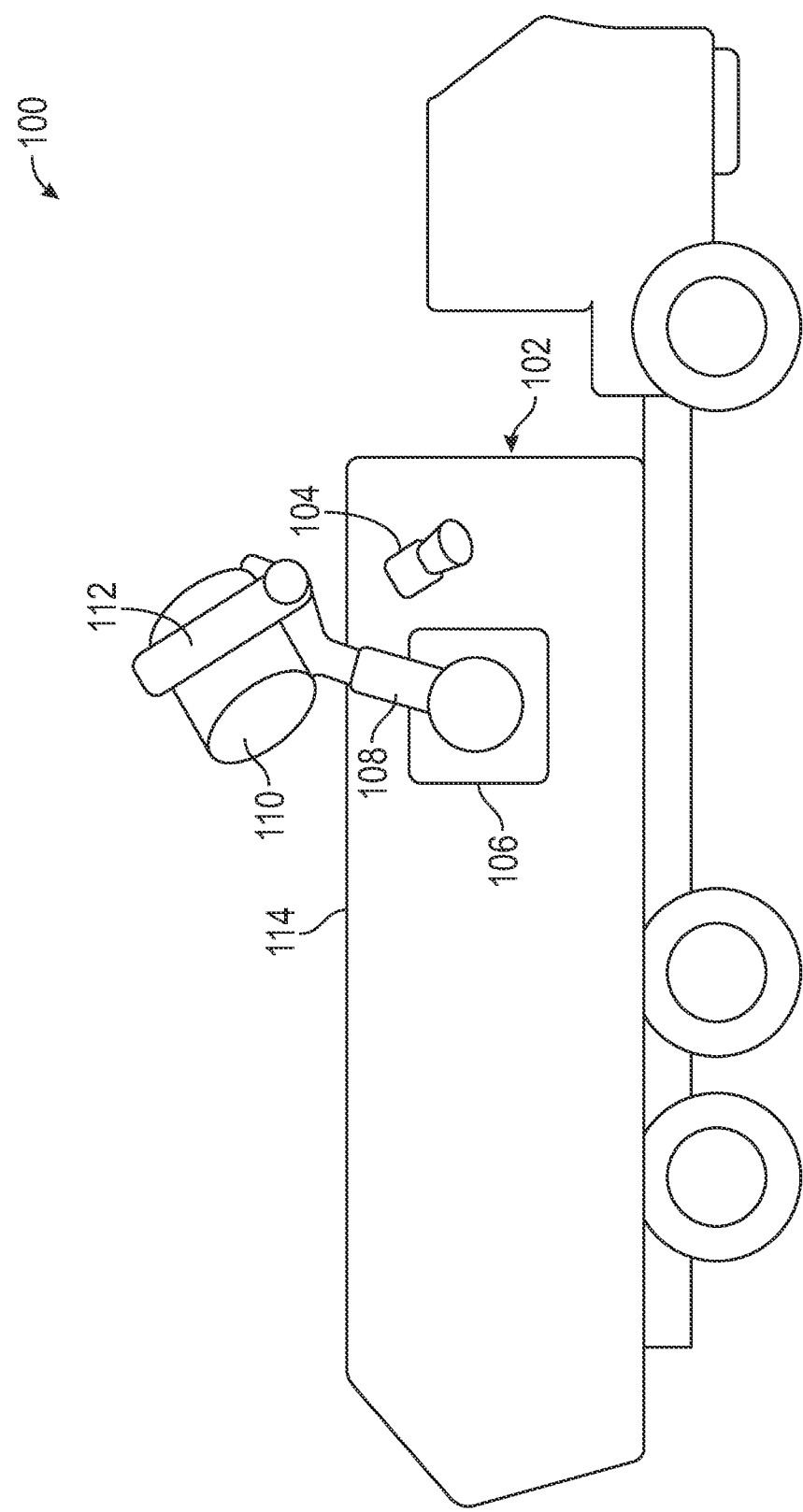
FIG. 1 is a schematic diagram of a system for detecting and picking up a waste receptacle, according to one embodiment.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

Referring to FIG. 1, there is a system 100 for detecting and picking up a waste receptacle. The system 100 comprises a camera 104, an arm-actuation module 106, and an arm 108 for collecting the waste from a waste receptacle 110. According to some embodiments, the system 100 can be mounted on a waste-collection vehicle 102. When the camera 104 detects the waste receptacle 110, for example along a curb, arm-actuation module 106 moves the arm 108 so that the waste receptacle 110 can be dumped into the waste-collection vehicle 102.

A waste receptacle is a container for collecting or storing garbage, recycling, compost, and other refuse, so that the garbage, recycling, compost, or other refuse can be pooled with other waste, and transported for further processing. Generally speaking, waste may be classified as residential, commercial, industrial, etc. As used here, a "waste receptacle" may apply to any of these categories, as well as others. Depending on the category and usage, a waste receptacle may take the form of a garbage can, a dumpster, a recycling "blue box", a compost bin, etc. Further, waste receptacles may be used for curb-side collection (e.g. at certain residential locations), as well as collection in other specified locations (e.g. in the case of dumpster collection).

The camera 104 is positioned on the waste-collection vehicle 102 so that, as the waste-collection vehicle 102 is driven along a path, the camera 104 can capture real-time images adjacent to or in proximity of the path.

The arm 108 is used to grasp and move the waste receptacle 110. The particular arm that is used in any particular embodiment may be determined by such things as the type of waste receptacle, the location of the arm 108 on the waste-collection vehicle, etc.

The arm 108 is generally movable, and may comprise a combination of telescoping lengths, flexible joints, etc., such that the arm 108 can be moved anywhere within a three-dimensional volume that is within range of the arm 108.

According to some embodiments, the arm 108 may comprise a grasping mechanism 112 for grasping the waste receptacle 110. The grasping mechanism 112 may include any combination of mechanical forces (e.g. friction, compression, etc.) or magnetic forces in order to grasp the waste receptacle 110.

The grasping mechanism 112 may be designed for complementary engagement with a particular type of waste receptacle 110. For example, in order to pick up a cylindrical waste receptacle, such as a garbage can, the grasping mechanism 112 may comprise opposed fingers, or circular claws, etc., that can be brought together or cinched around the garbage can. In other cases, the grasping mechanism 112 may comprise arms or levers for complementary engagement with receiving slots on the waste receptacle.

Generally speaking, the grasping mechanism 112 may be designed to complement a specific waste receptacle, a specific type of waste receptacle, a specific model of waste receptacle, etc.

The arm-actuation module 106 is generally used to mechanically control and move the arm 108, including the grasping mechanism 112. The arm-actuation module 106 may comprise actuators, pneumatics, etc., for moving the arm. The arm-actuation module 106 is electrically controlled by a control system for controlling the movement of the arm 108. The control system can provide control instructions to the arm-actuation module 106 based on the real-time image captured by the camera 104.

The arm-actuation module 106 controls the arm 108 in order to pick up the waste receptacle 110 and dump the waste receptacle 110 into the bin 114 of the waste-collection vehicle 102. In order to accomplish this, the control system that controls the arm-actuation module 106 first determines whether the image captured by the camera 104 corresponds to a target waste receptacle.

In some embodiments, a plurality of bins can be provided in a single waste-collection vehicle 102. Each bin can hold a particular stream of waste collection, such as garbage, waste, or compost. In some embodiments, the waste-collection vehicle 102 includes a divider (not shown) for guiding the contents of a waste receptacle into one of the plurality of bins. In some embodiments, a divider-actuation module can also be provided for mechanically controlling and moving a position of the divider (not shown). The divider-actuation module may comprise actuators, pneumatics, etc., for moving the divider. The divider-actuation module can be electrically controlled by the control system for controlling the position of the divider. The control system can provide control instructions to the divider-actuation module based on the real-time image captured by the camera 104.

The control system uses artificial intelligence to determine whether the image corresponds to a target waste receptacle. More specifically, the control system uses a convolutional neural network (CNN) to generate an object candidate and determine whether the object candidate corresponds to a target waste receptacle class with sufficient confidence. Training and implementation of the CNN will be described in further detail below.

As described above, waste receptacles are typically dedicated to a particular stream of waste collection, either garbage, recycling, or compost. Each collection stream is herein referred to as a class. Multiple similarly shaped waste receptacles can be used for different classes and for the same classes. Similarly shaped waste receptacles can have different dimensions, contours, and tapering.

In some cases, classes can be distinguished using features such as colors or decals. That is, identically shaped waste receptacles having different colors can be used for different classes. For example, black, blue, and green receptacles can represent garbage, recycling, and compost respectively. Furthermore, a single class can include multiple similarly shaped waste receptacles having the same color.

Figure 2B:
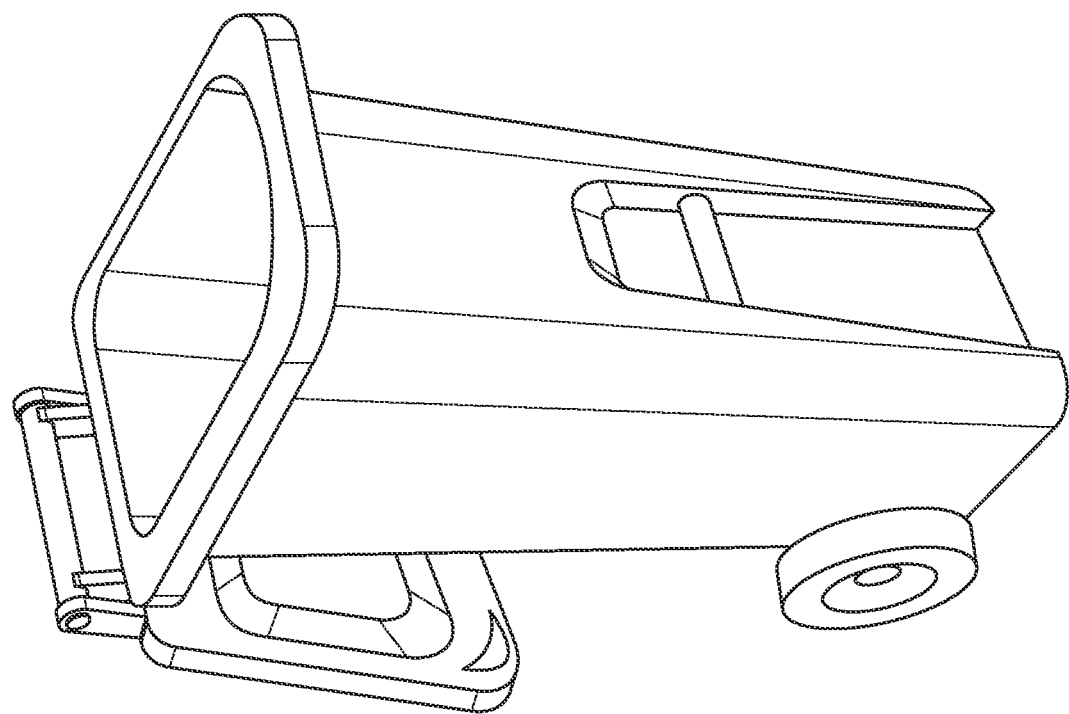
FIGS. 2B to 2H are images of the waste receptacle shown in FIG. 2A.
Figure 2A:
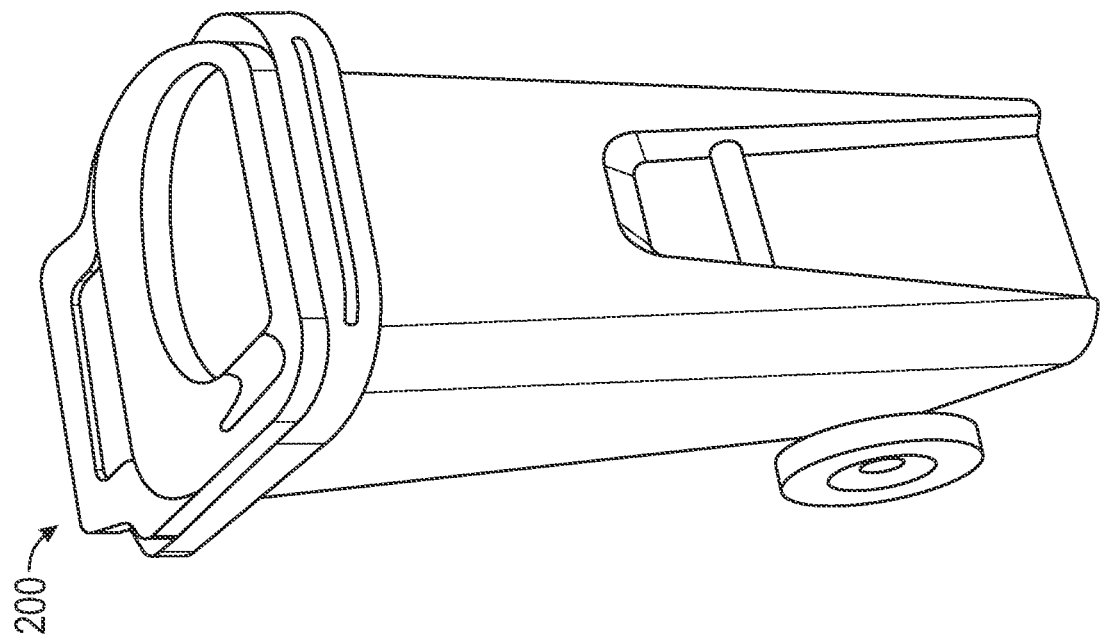
FIG. 2A is a pictorial representation of a waste receptacle.
Figure 2D:
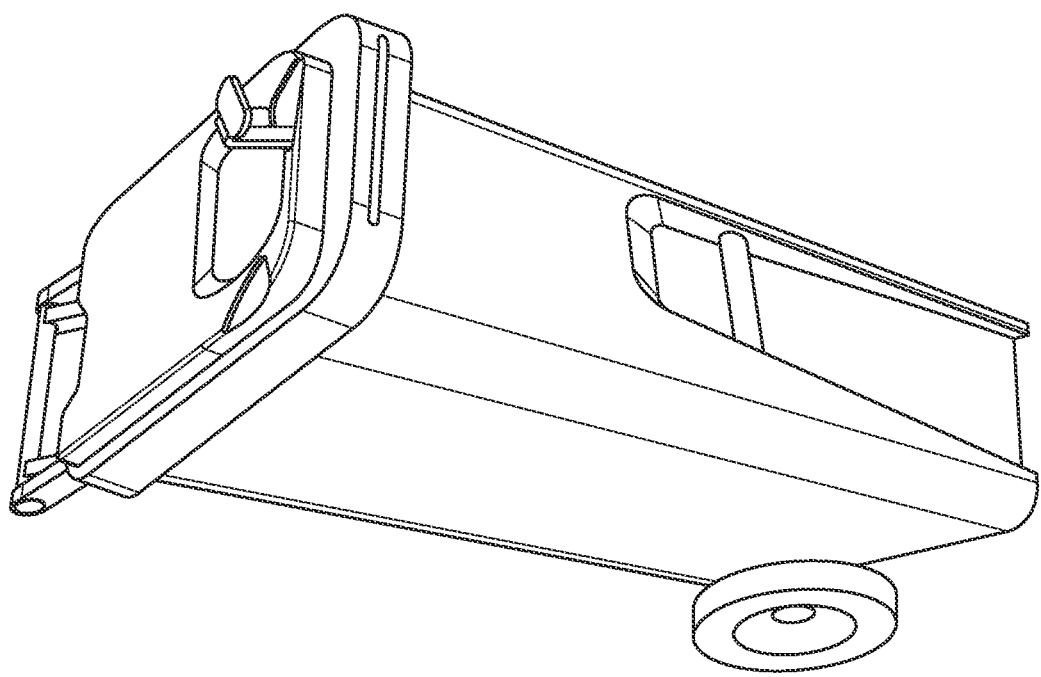
Figure 2C:
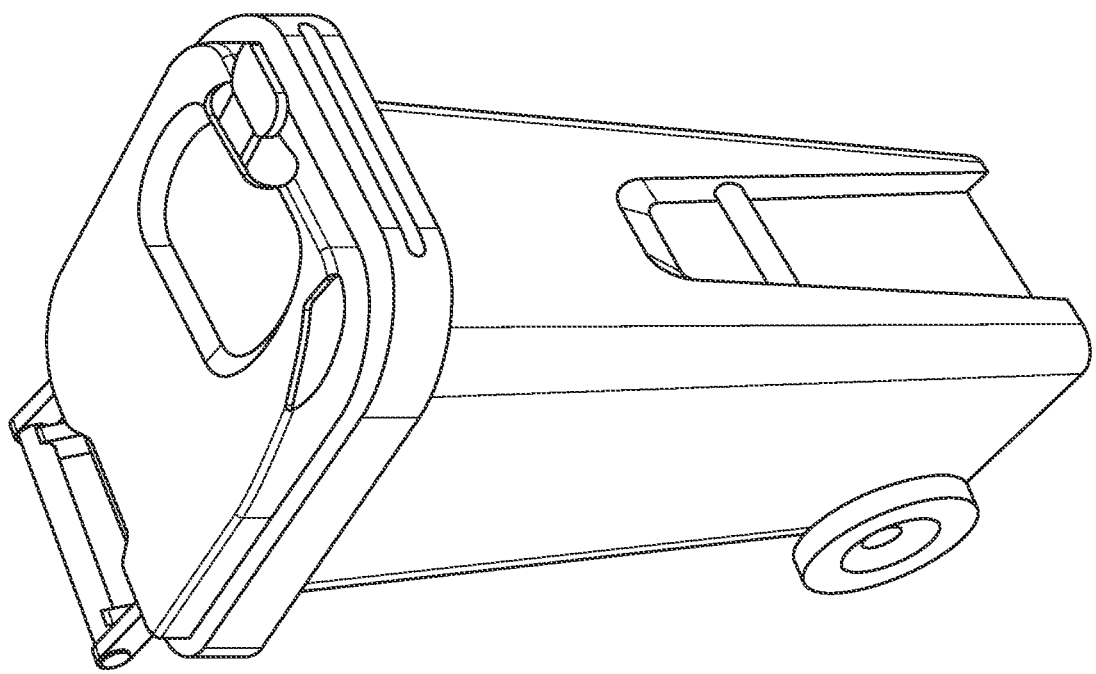
Figure 2F:
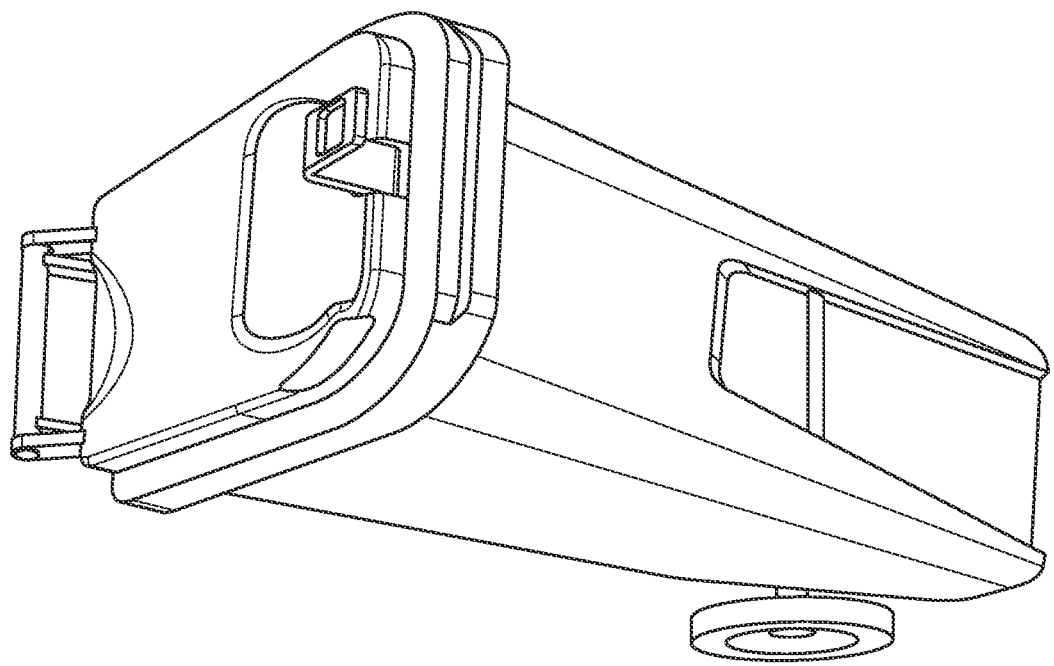
Figure 2E:
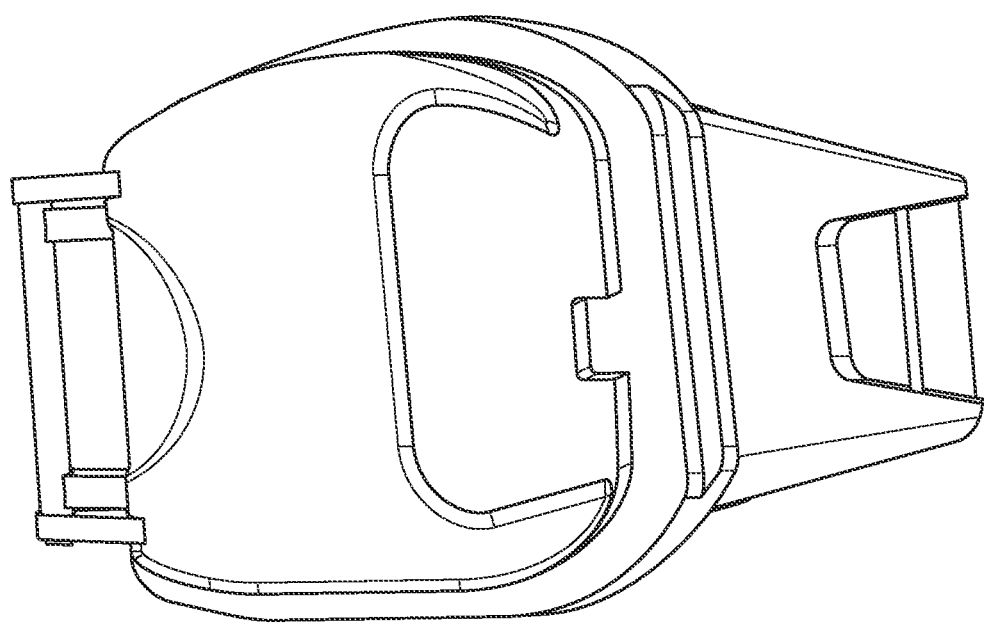
Figure 2H:
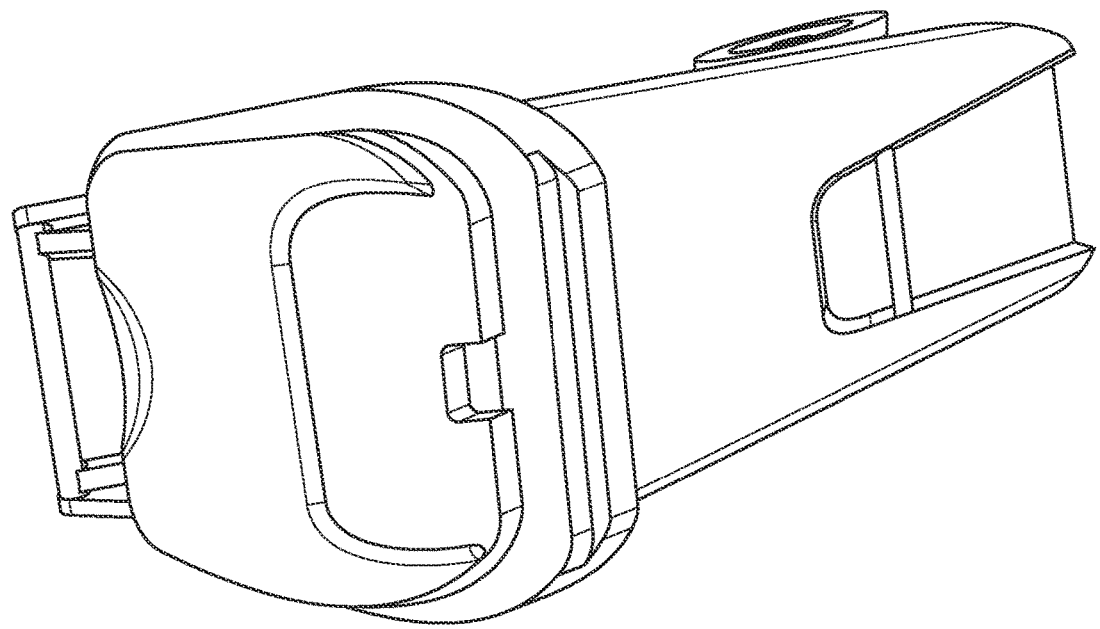
Figure 2G:
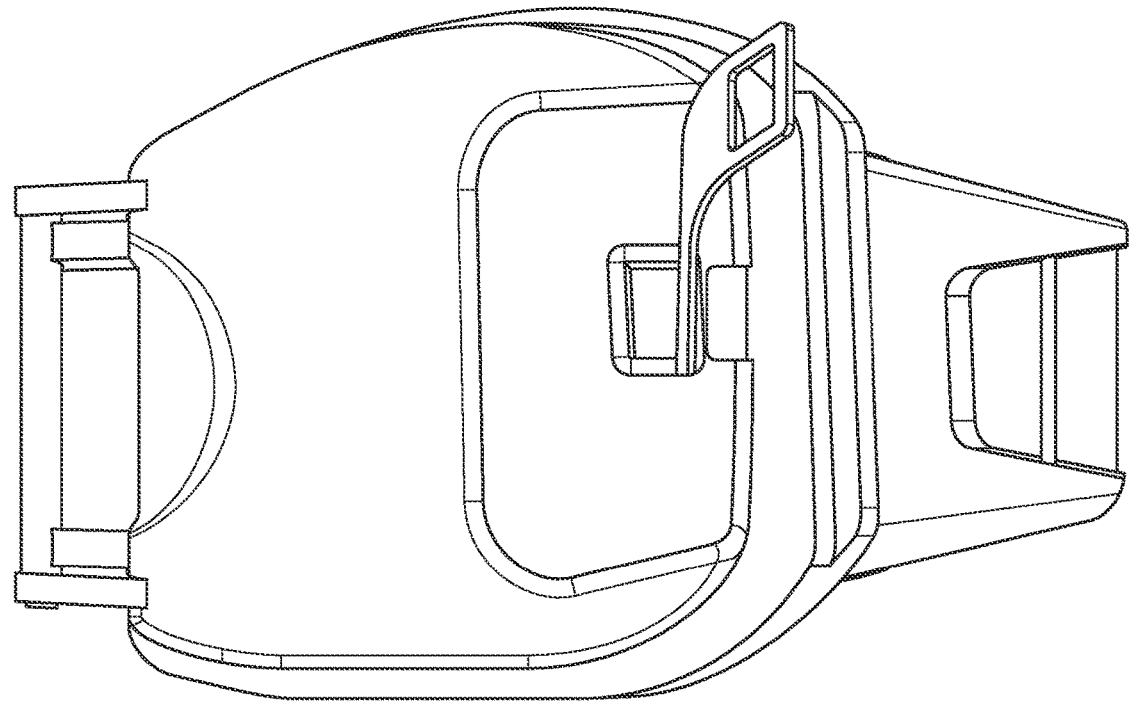
Figure 3B:
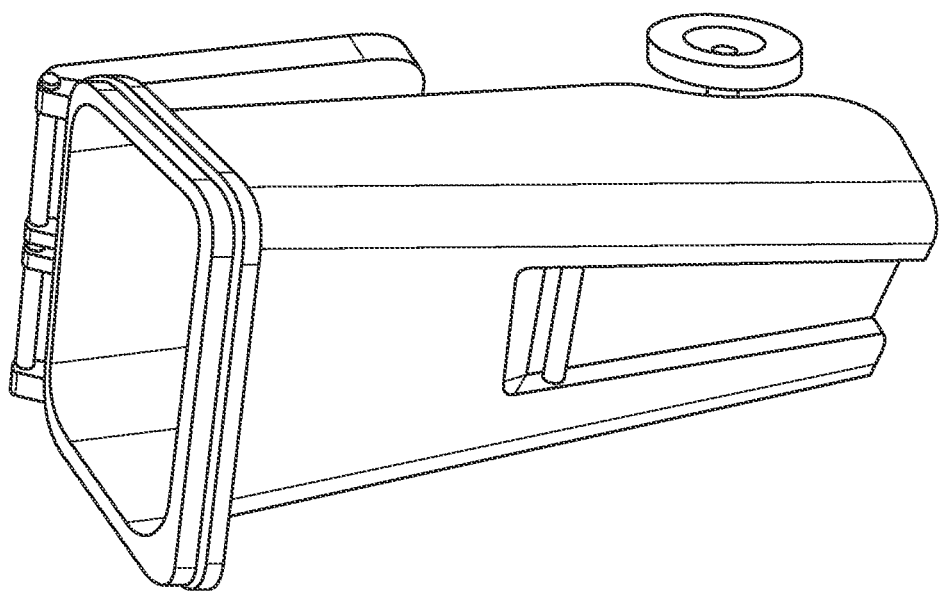
FIGS. 3B to 3H are images of the waste receptacle shown in FIG. 3A.
Figure 3A:
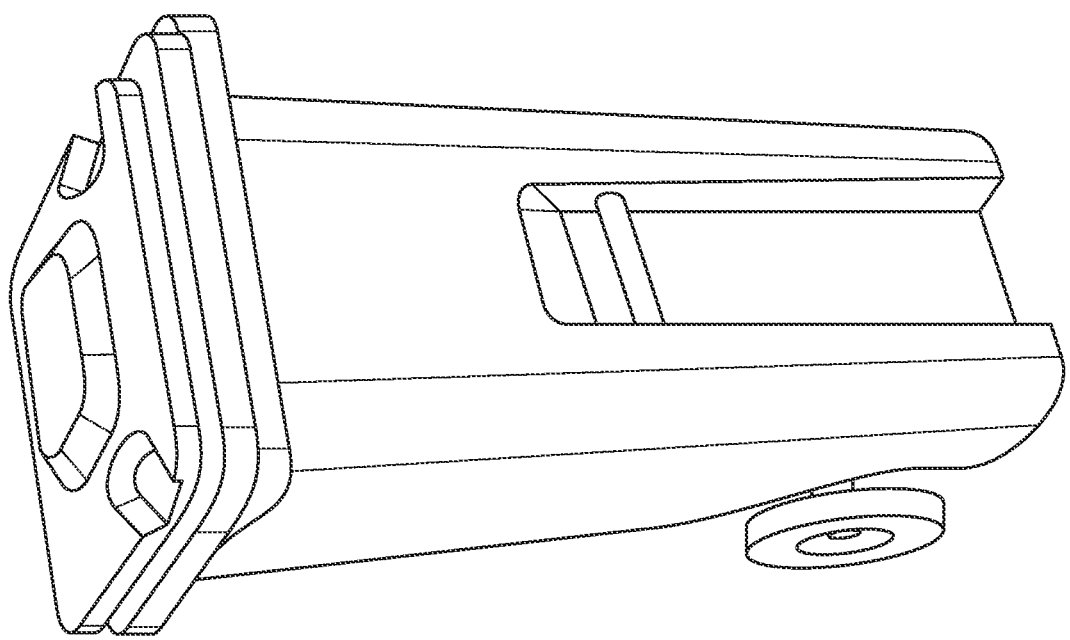
FIG. 3A is a pictorial representation of a second waste receptacle.
Figure 3D:
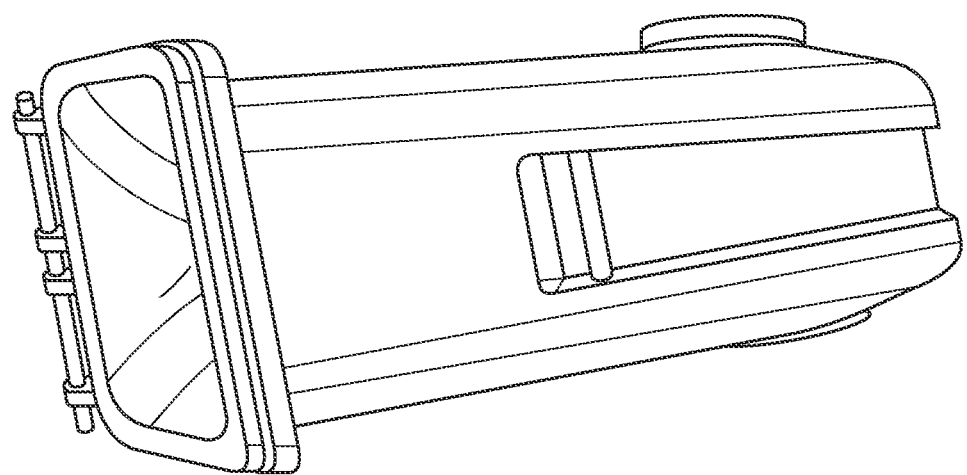
Figure 3C:
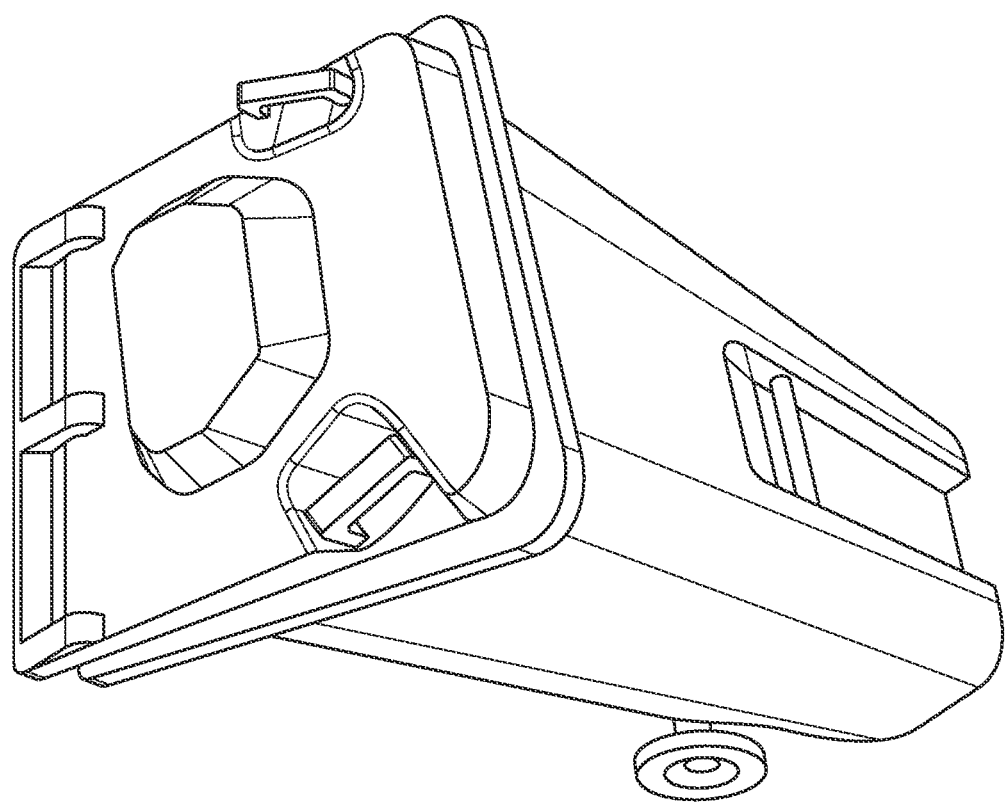
Figure 3F:
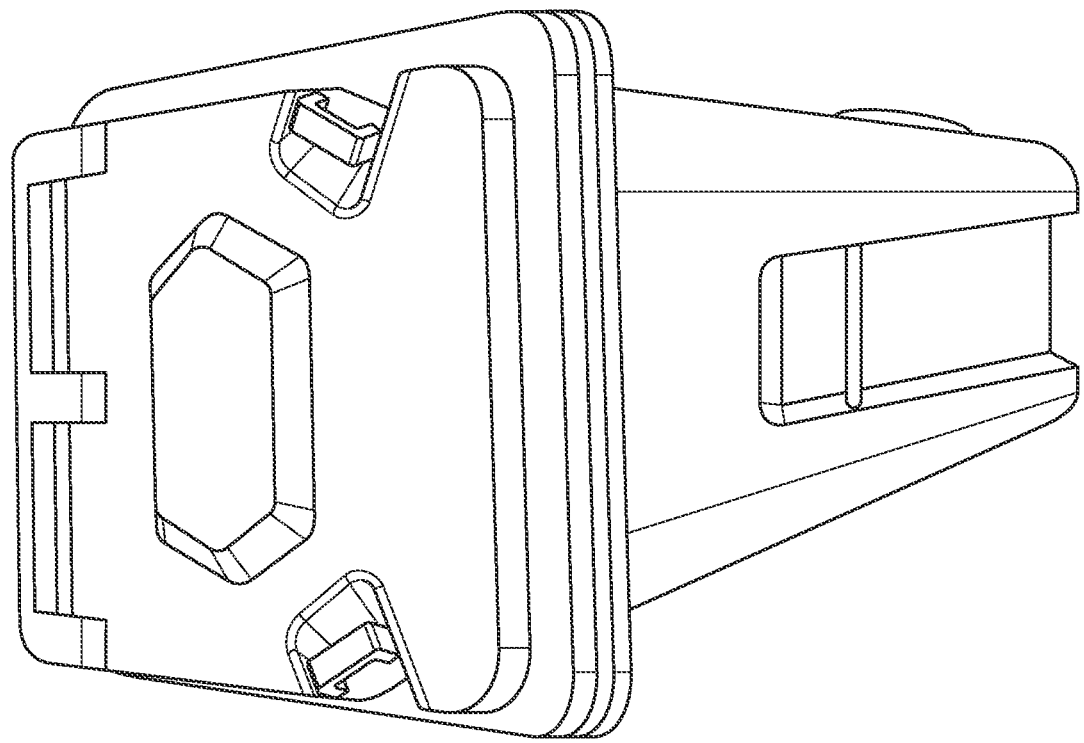
Figure 3E:
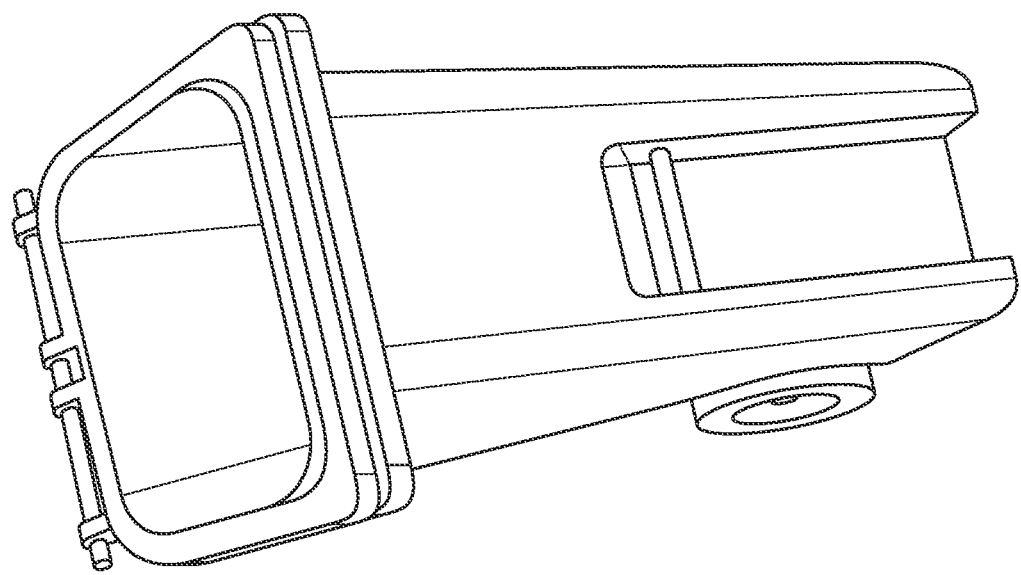
Figure 3H:
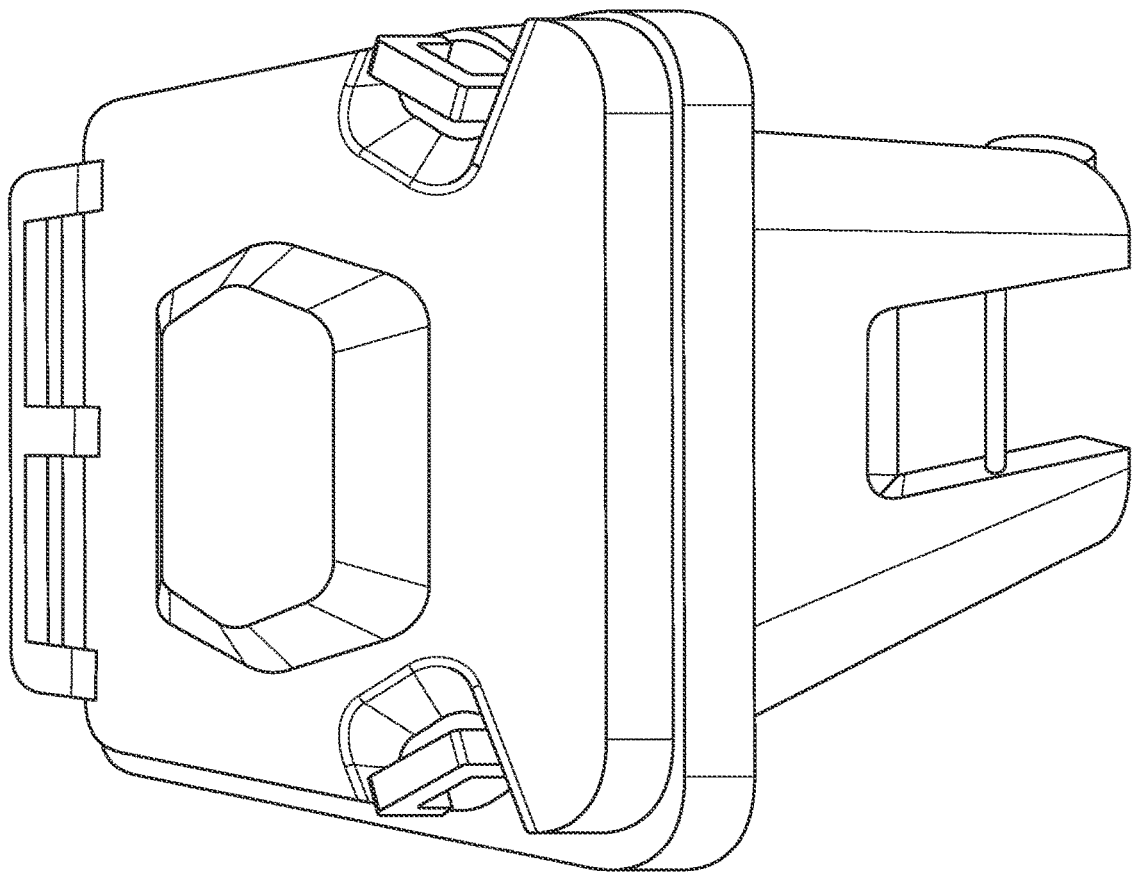
Figure 3G:
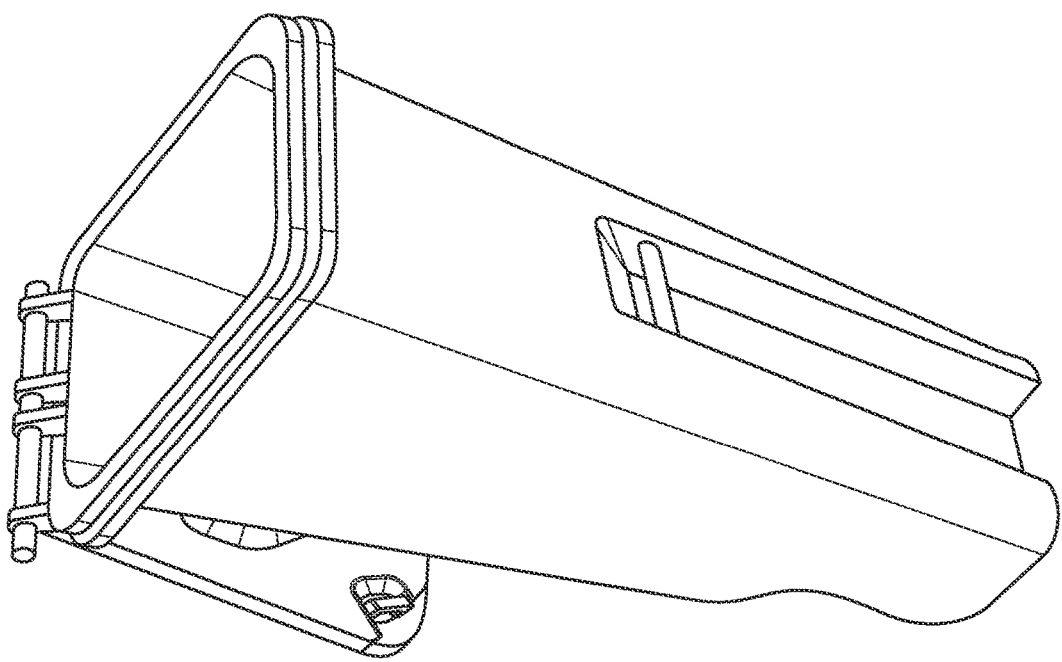
Figure 4B:
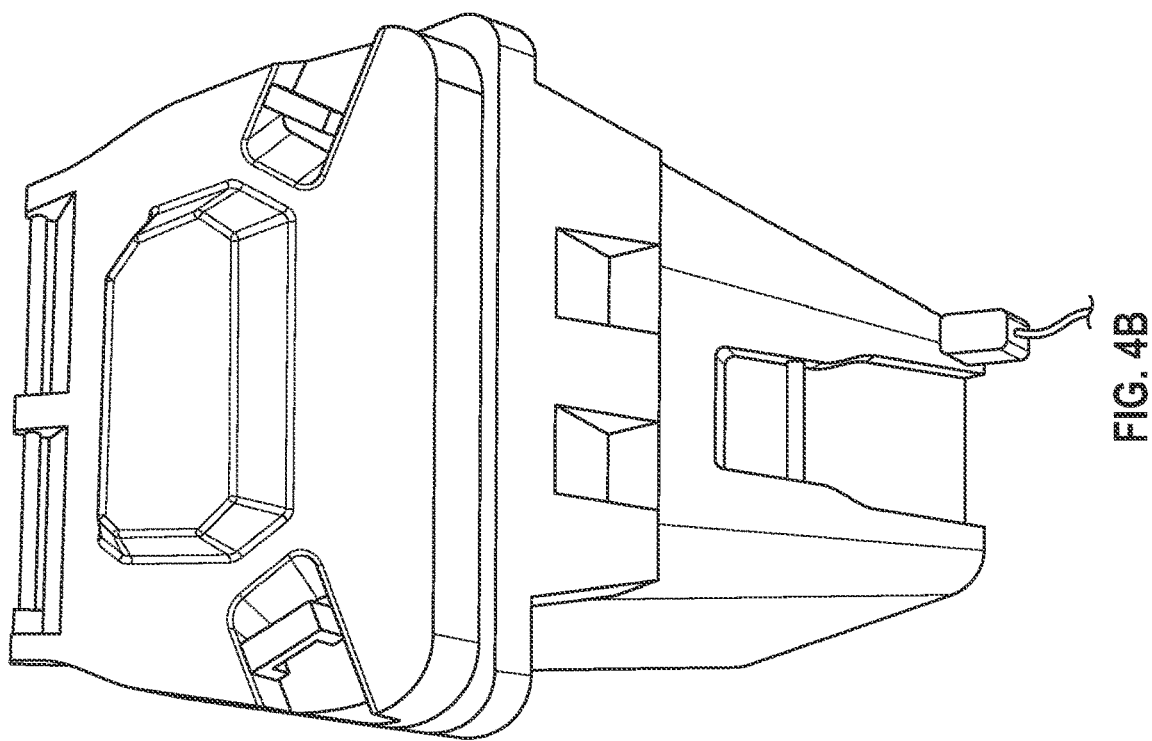
FIGS. 4B to 4H are images of the waste receptacle shown in FIG. 4A.
Figure 4A:
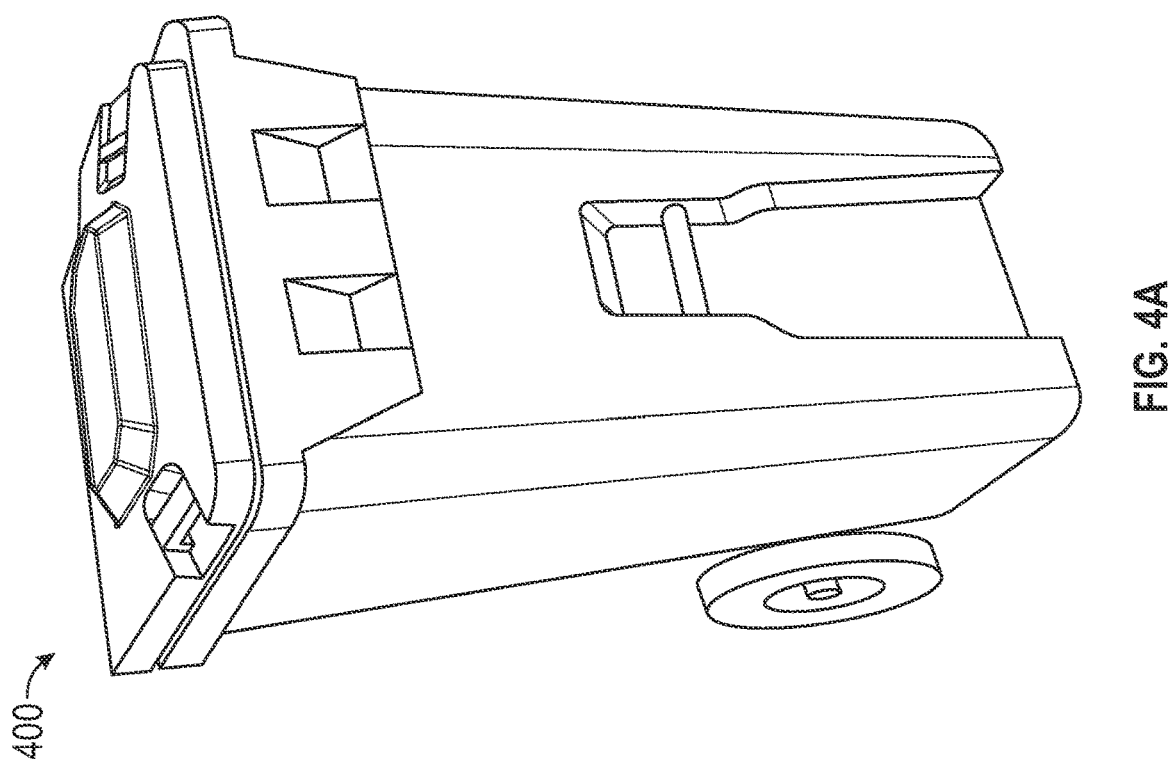
FIG. 4A is a pictorial representation of a third waste receptacle.
Figure 4D:
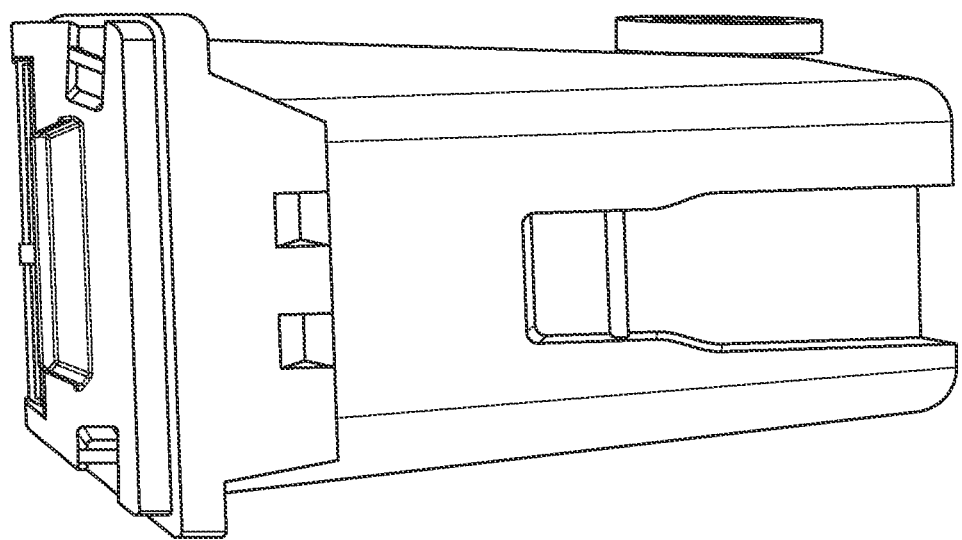
Figure 4C:
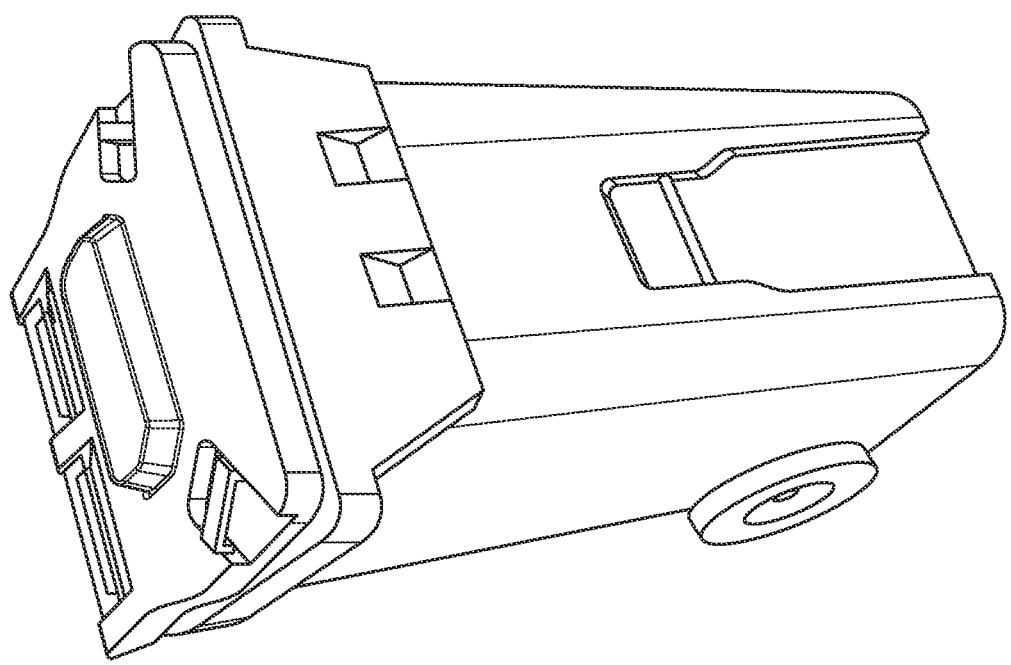
Figure 4F:
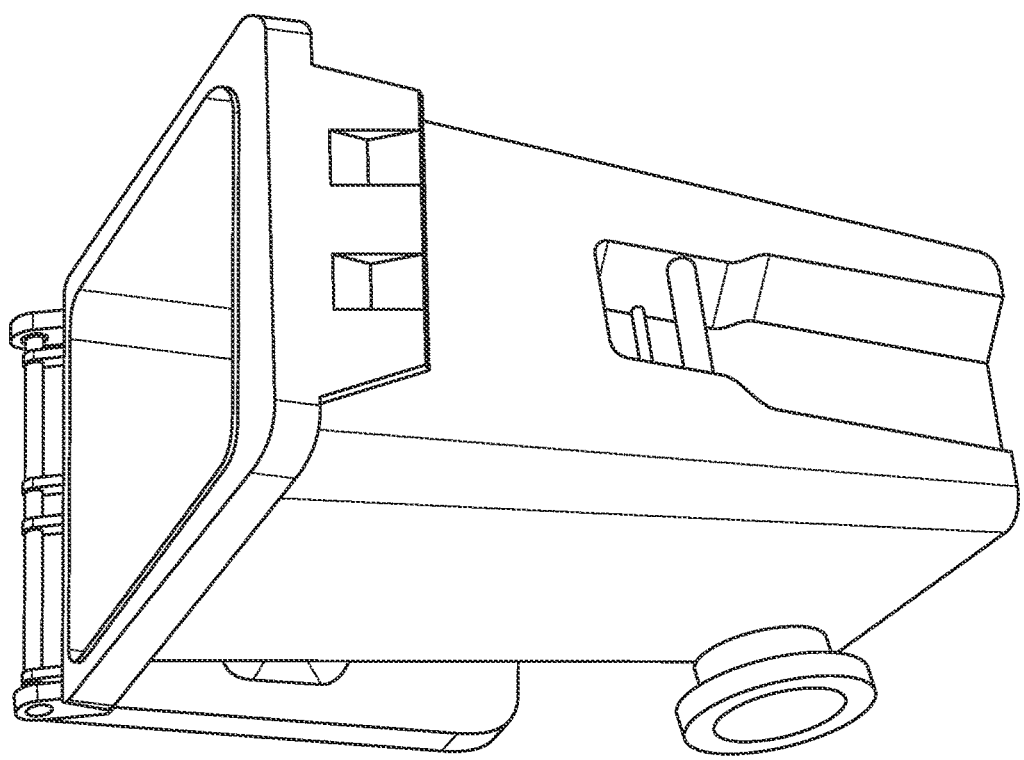
Figure 4E:
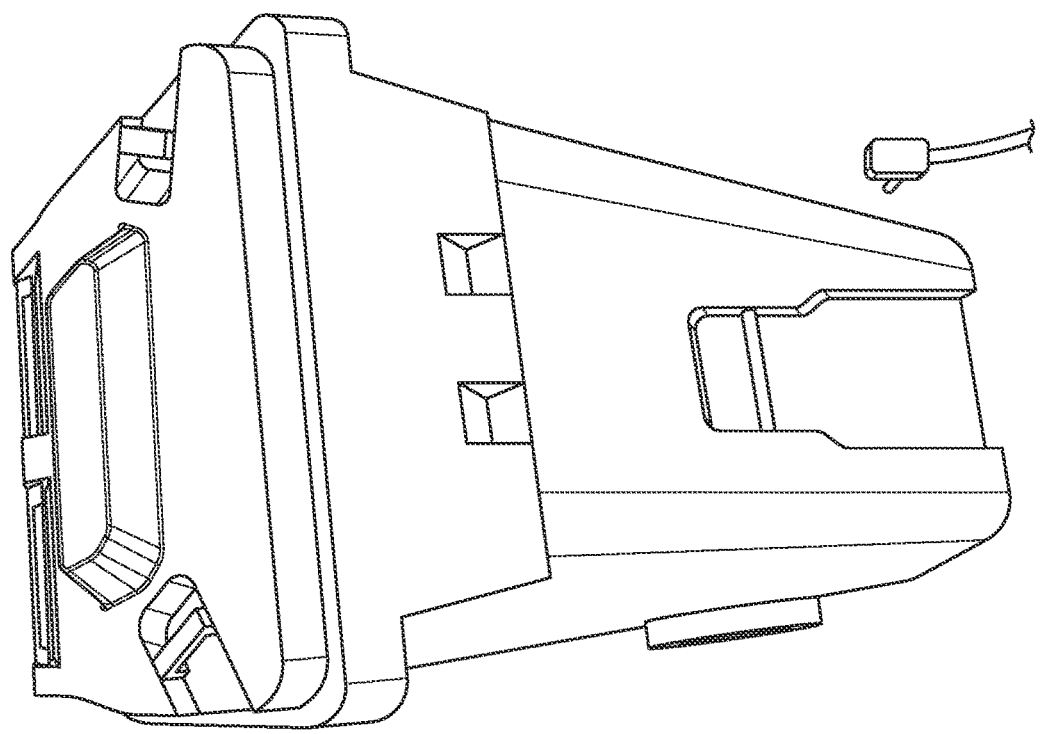
Figure 4H:
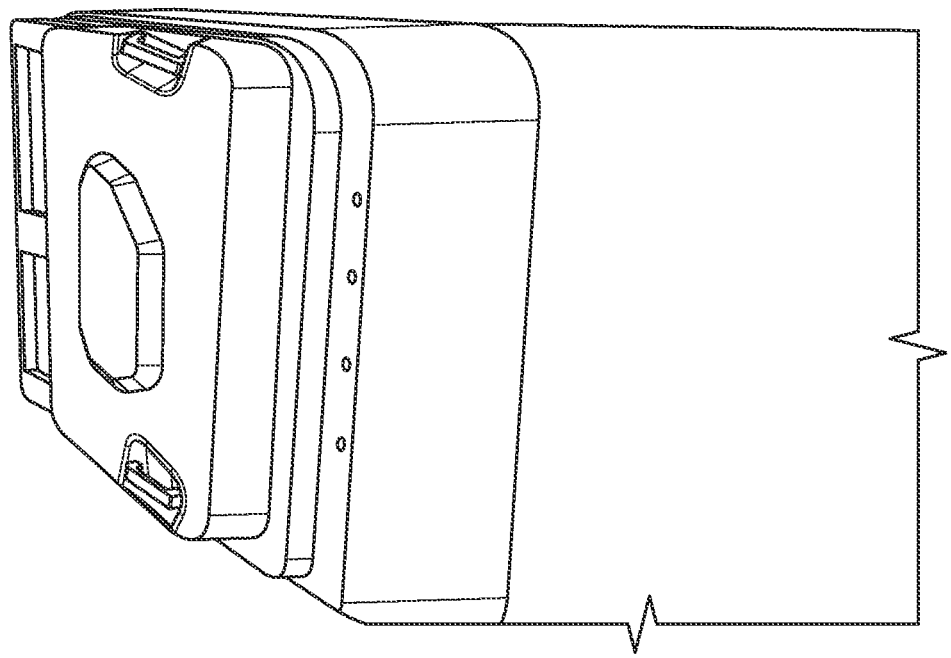
Figure 4G:
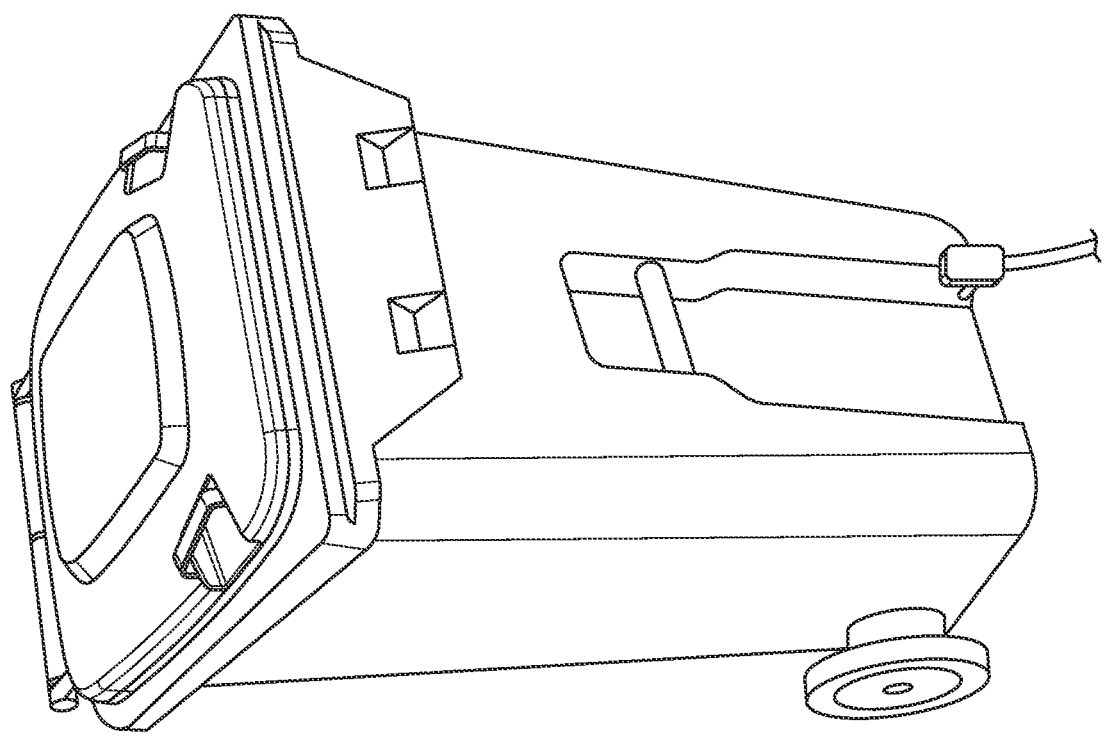
Figure 5B:
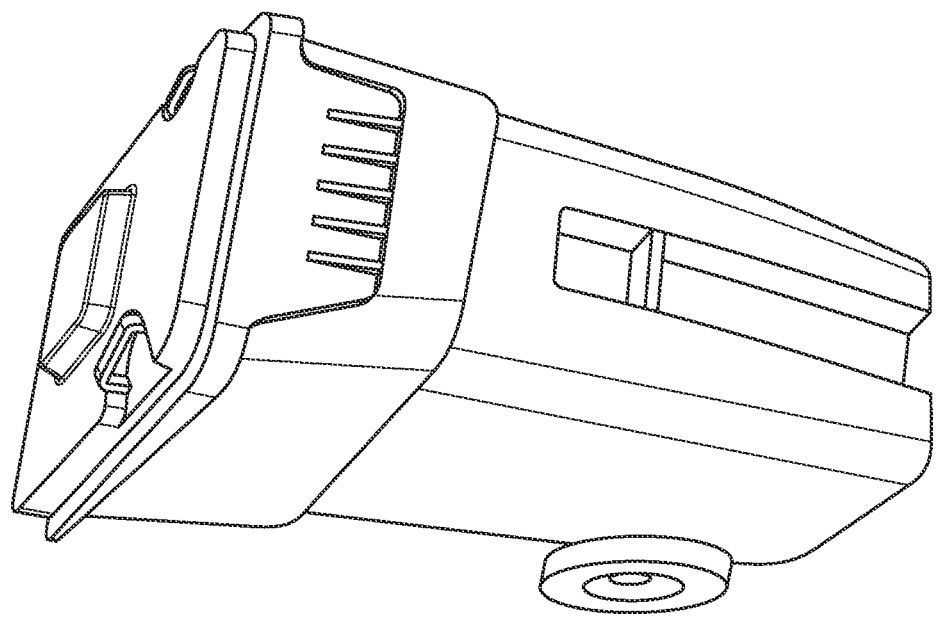
FIGS. 5B to 5H are images of the waste receptacle shown in FIG. 5A.
Figure 5A:
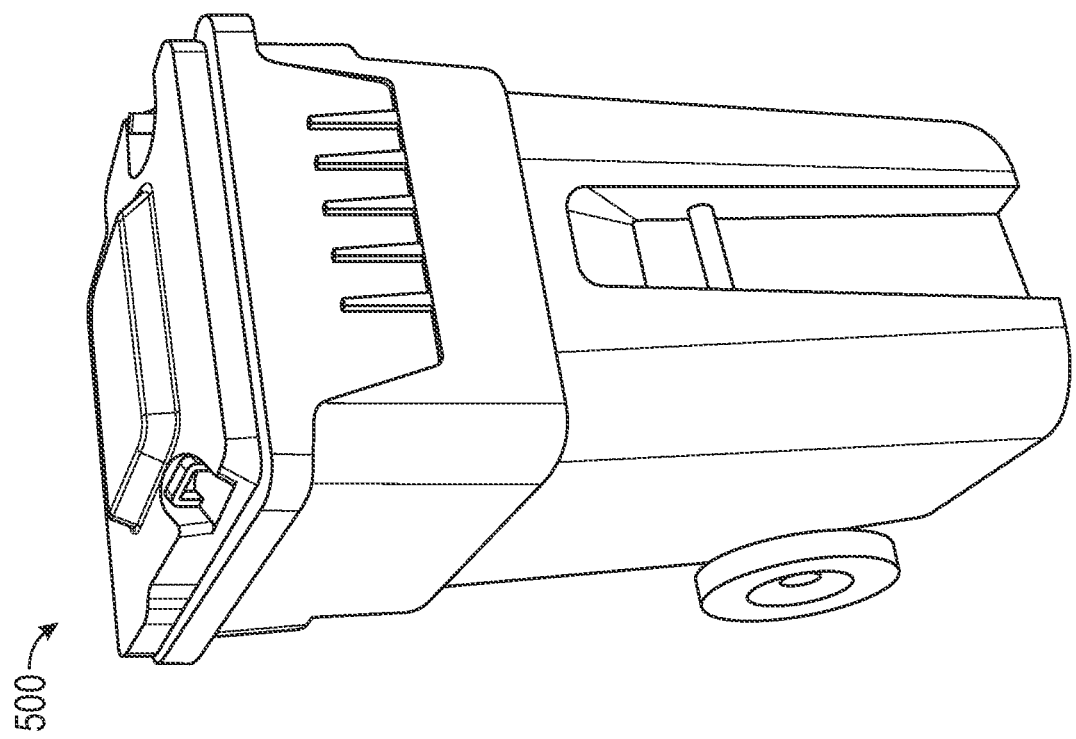
FIG. 5A is a pictorial representation of a fourth waste receptacle.
Figure 5D:
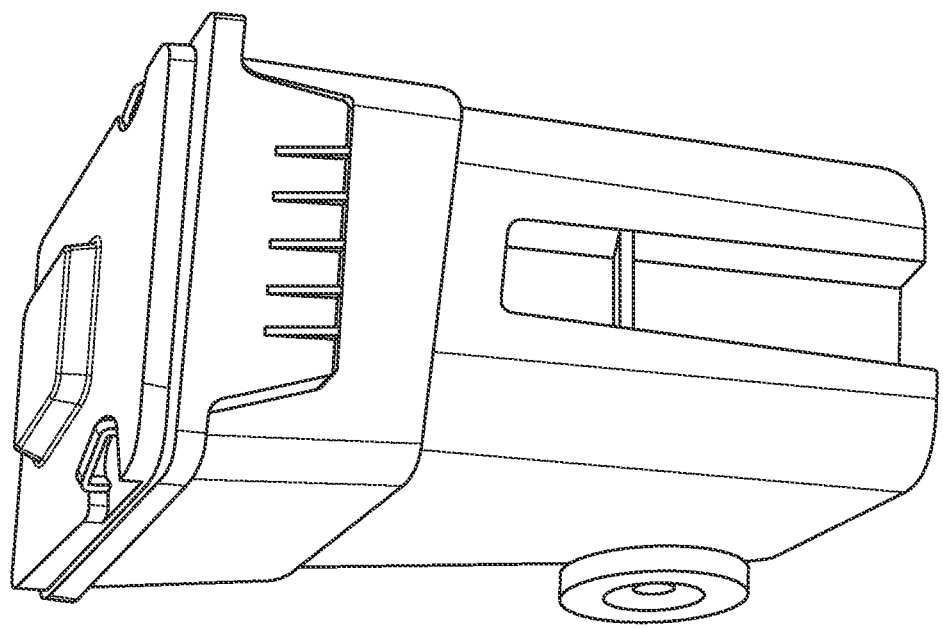
Figure 5C:
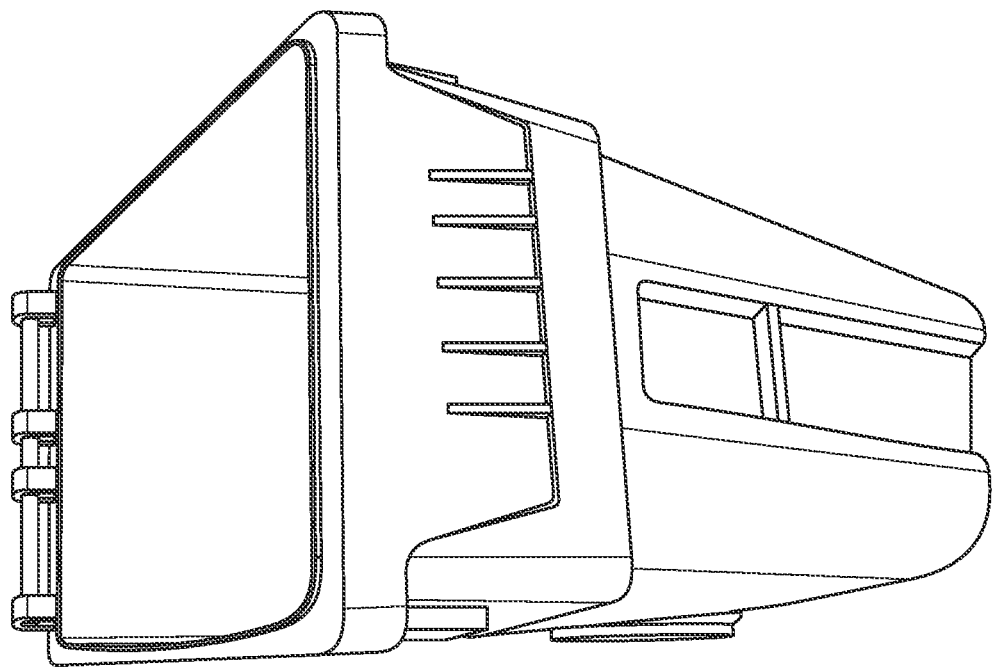
Figure 5F:
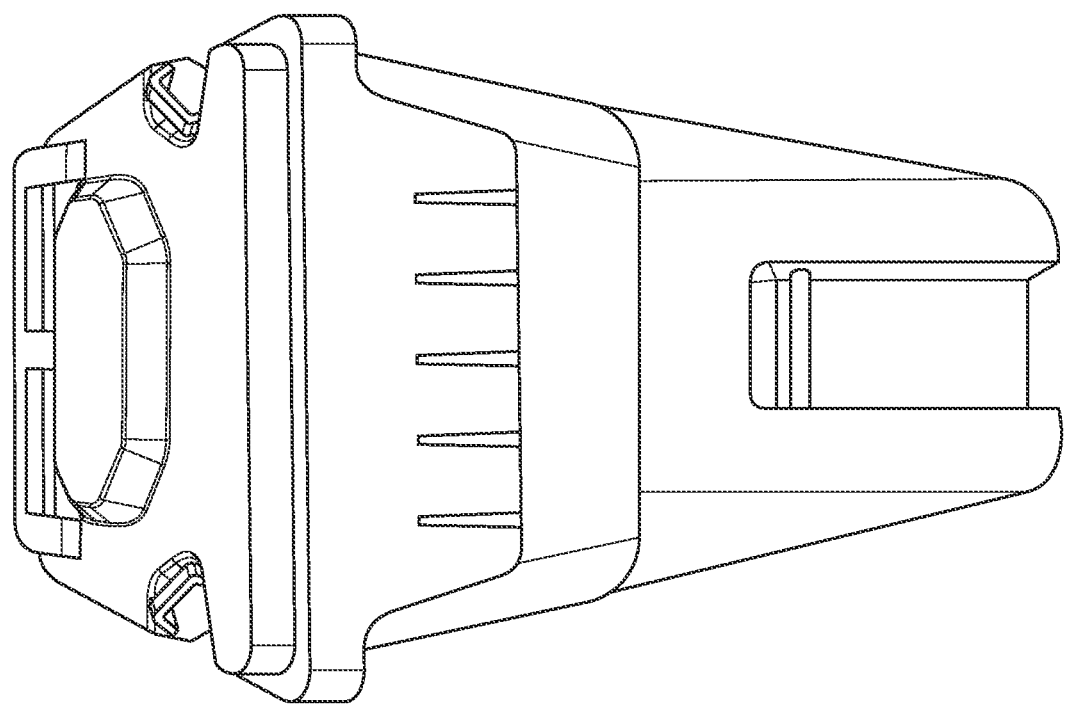
Figure 5E:
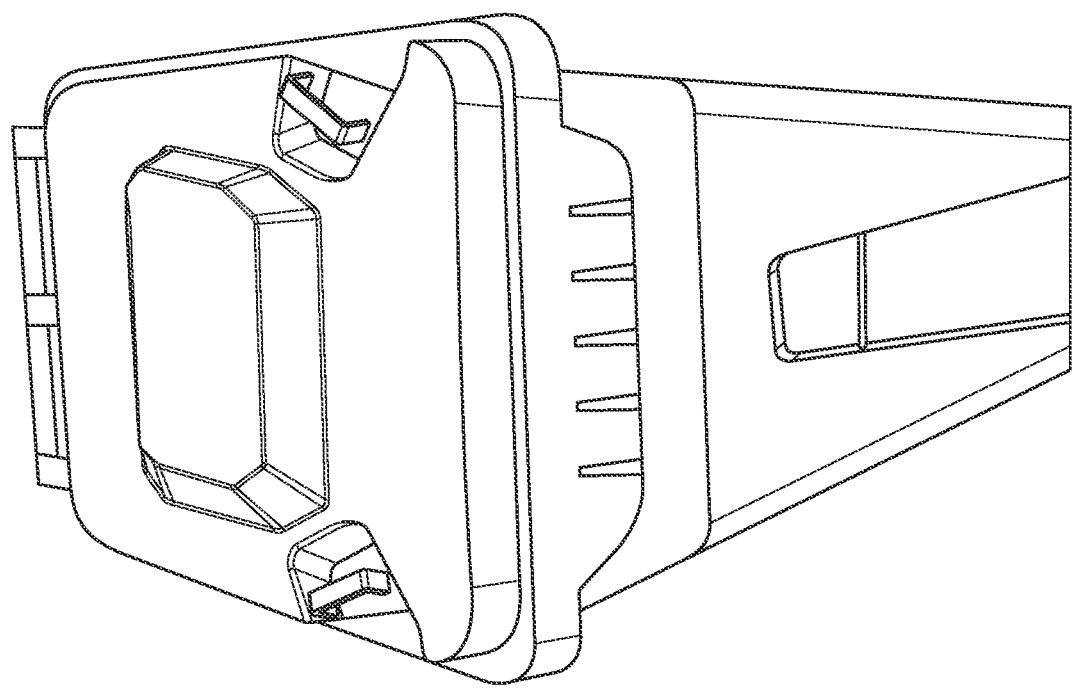
Figure 5H:
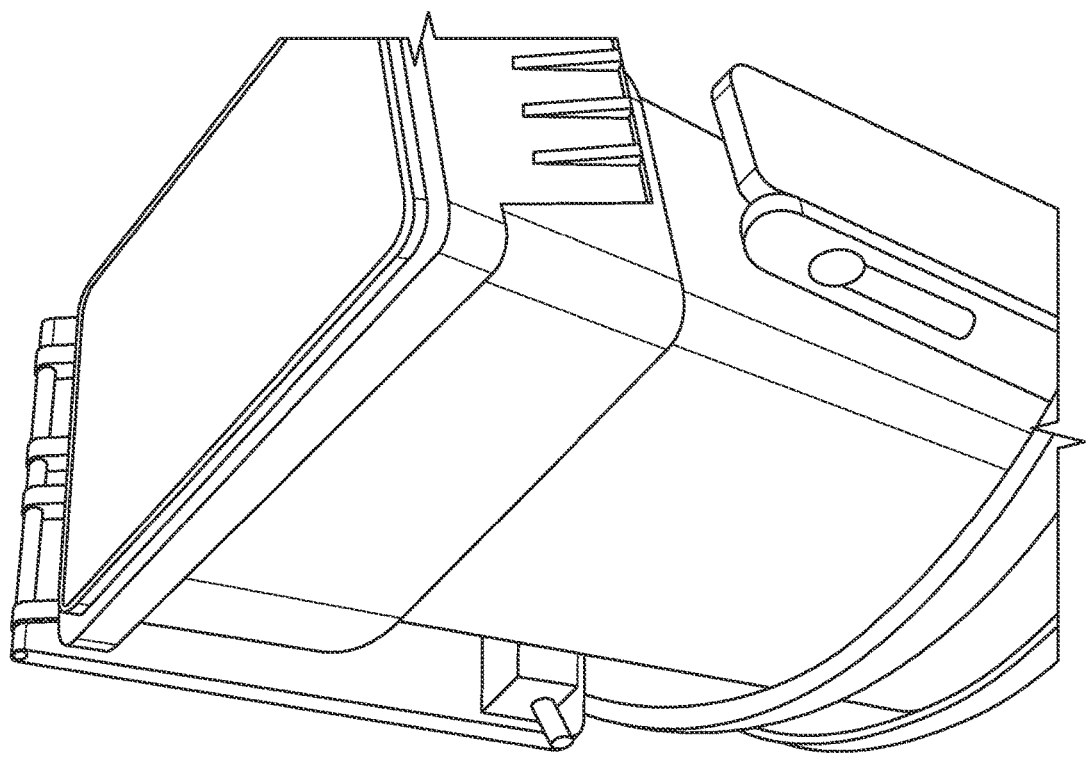
Figure 5G:
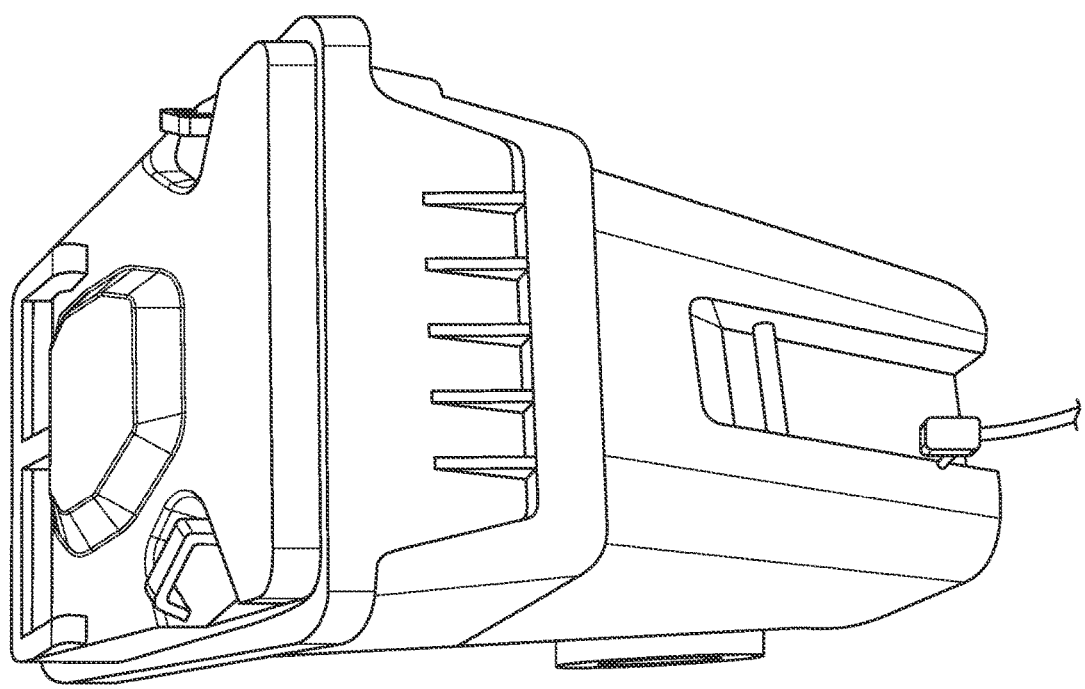

Referring to FIGS. 2A to 5H, there is shown examples of similarly shaped waste receptacles. FIG. 2A is a pictorial representation of a waste receptacle 200 and FIGS. 2B to 2H are images of the same. In FIGS. 2B to 2H, the waste receptacle is green.

FIGS. 3A to 3H show a pictorial representation and images of a second waste receptacle 300. The second waste receptacle 300 shares a generally similar shape as that waste receptacle 200 with minor differences in dimensions, tapering, and contours. In FIG. 3B to 3H, the second waste receptacle 300 is blue.

FIGS. 4A to 4H show a pictorial representation and images of a third waste receptacle 400. The third waste receptacle 400 also shares a generally similar shape as that of waste receptacle 200 and 300 with minor differences in dimensions, tapering, and contours. In FIGS. 4B to 4H, the third waste receptacle 400 is also blue.

FIGS. 5A to 5H show a pictorial representation and images of a fourth waste receptacle 500. Again, the fourth waste receptacle 500 shares a generally similar shape as that of waste receptacle 200, 300, and 400, with minor differences in dimensions, tapering, and contours. In FIGS. 5B to 5H, the fourth waste receptacle 500 is also blue.

Figure 6:
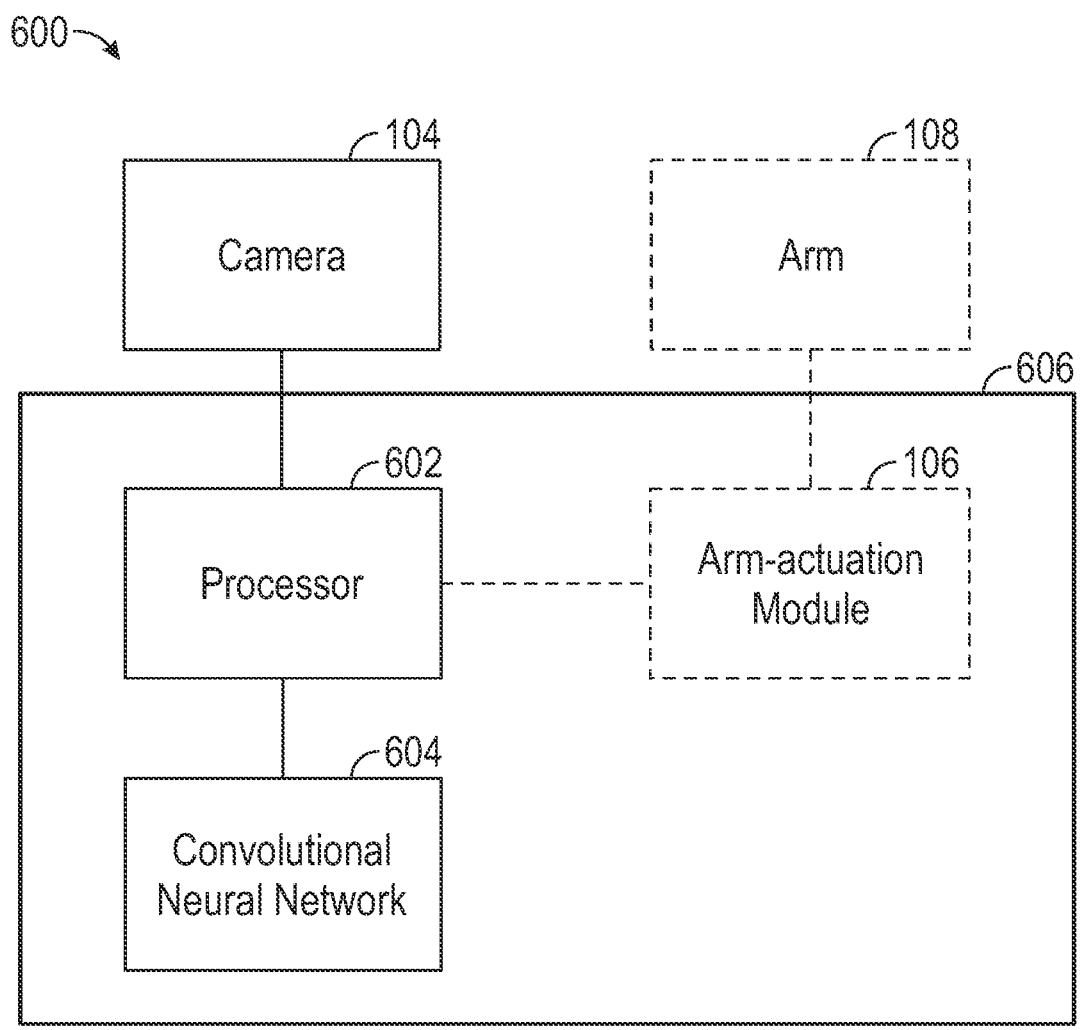
FIG. 6 is a network diagram showing a system for detecting and picking up a waste receptacle.

Referring to FIG. 6, there is shown a system 600 for detecting a waste receptacle. The system comprises a control system 606 and a camera 104. The control system 606 comprises a processor 602 and a convolutional neural network (CNN) 604. According to some embodiments, the system 600 can be mounted on or integrated with a waste-collection vehicle, such as waste-collection vehicle 102. The processor 602 can be a central processing unit (CPU) or a graphics processing unit (GPU). Preferably, the processor 602 is a GPU so that speed performance of the CPU is not reduced.

In some embodiments, as indicated by dashed lines in FIG. 6, the system 600 can also be configured to pick up the waste receptacle. In such cases, the system 600 can further include an arm 108 and an arm actuation module 106. When an arm actuation module 106 is provided, it can be included in the control system 606.

In use, the camera 104 captures real-time images adjacent to the waste-collection vehicle as the waste-collection vehicles is driven along a path. For example, the path may be a residential street with garbage cans placed along the curb. The real-time image from the camera 104 is communicated to the processor 602. The real-time image from the camera 104 may be communicated to the processor 602 using additional components such as memory, buffers, data buses, transceivers, etc., which are not shown.

In some embodiments, the camera 104 captures video at a particular frame rate. In such cases, the processor 602 is configured to receive the video from the camera 104 and perform additional processing to obtain the image. That is, the processor 602 is configured to extract a frame from the video for use as the image.

The processor 602 is configured to receive the image from the camera 104. It will be understood that reference made in this document to images from the camera 104 also include video, from which images can be extracted. Based on the image, the processor 602 determines whether the image corresponds to a target waste receptacle using CNN 604. If the image corresponds to a target waste receptacle, the processor 602 calculates the location of the waste receptacle. The arm-actuation module 106 uses the location calculated by the processor 602 to move the arm 108 in order to pick up the waste receptacle 110 and dump contents of the waste receptacle 110 into the bin 114 of the waste-collection vehicle 102.

In some embodiments, the waste-collection vehicle has a plurality of bins and the contents of the waste receptacle 110 must be dumped in the appropriate bin. In some embodiments, a divider-actuation module can also use the object candidate, more specifically the object classification, to determine which bin the contents of the waste receptacle should be dumped into. Once the object classification is known, the divider-actuation module can move a position of the divider so that the divider guides the contents of the waste receptacle into an appropriate bin.

In order to determine whether the image corresponds to a target waste receptacle, the processor 602 must first detect that a waste receptacle is shown in the image. That is, the processor 602 generates an object candidate from the image. To do so, the image is processed in two stages: (i) feature extraction and (ii) object detection, based on the features extracted in the first stage. Based on the results of the object detection stage, an object candidate can be generated.

In some embodiments, object detection relates to defining a bounding box within which the waste receptacle is generally located in the image and classifying the waste receptacle shown in the image as being a collection stream (i.e., garbage, recycling, or compost). The bounding box definition can include pixel coordinates (i.e., offset or a pixel location) (x, y) and dimensions (i.e., width and height) of the bounding box (w, h).

Figure 7:
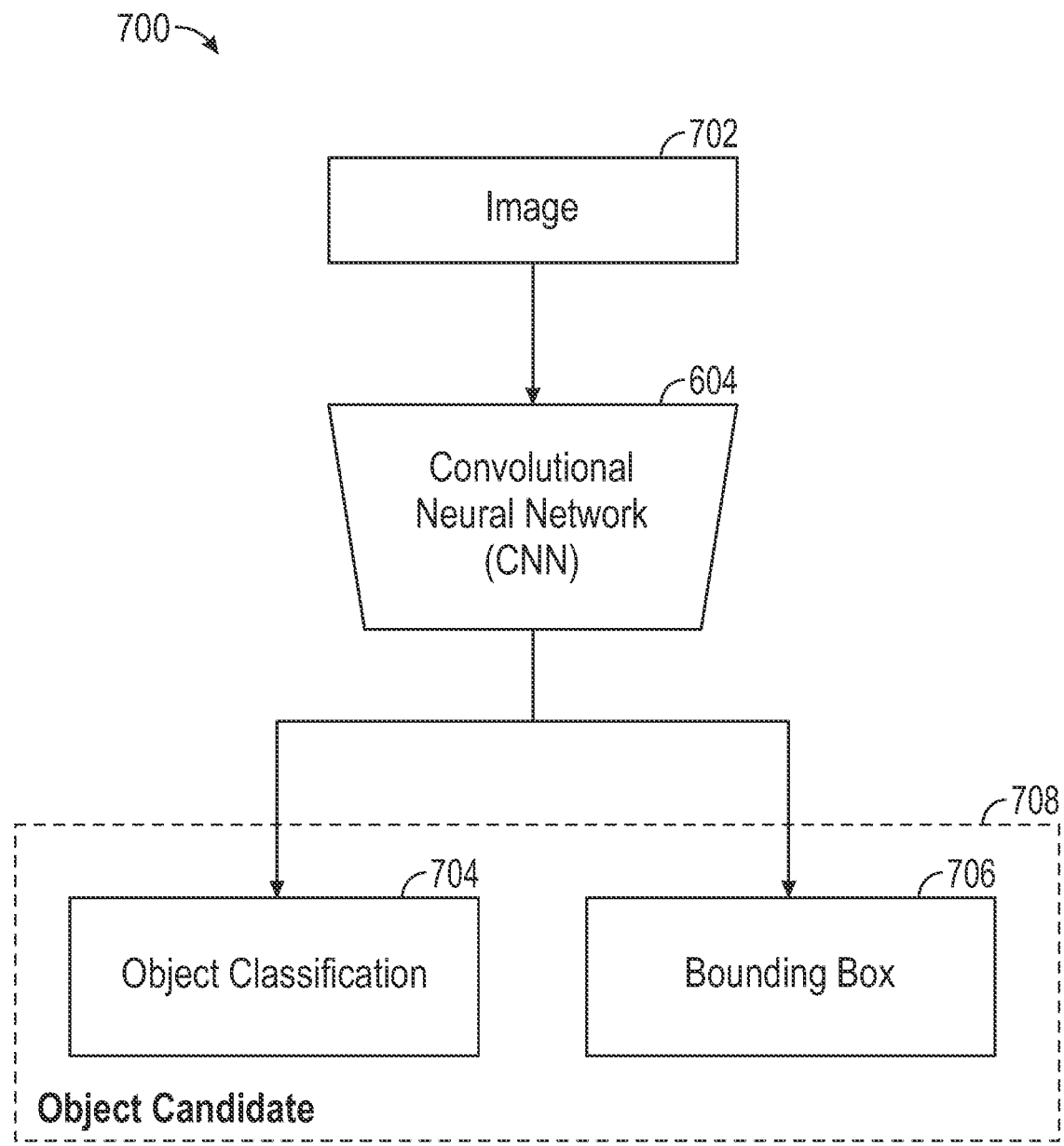
FIG. 7 is a flow diagram for generating an object candidate.

Referring to FIG. 7, there is shown a method 700 for generating an object candidate using CNN 604. An image 702 captured by the camera 104 is provided to the CNN 604. The CNN 604 predicts an object classification 704 and a bounding box 706 based on the image 702. The object classification 704 and the bounding box 706 together, form the object candidate 708.

Figure 8:
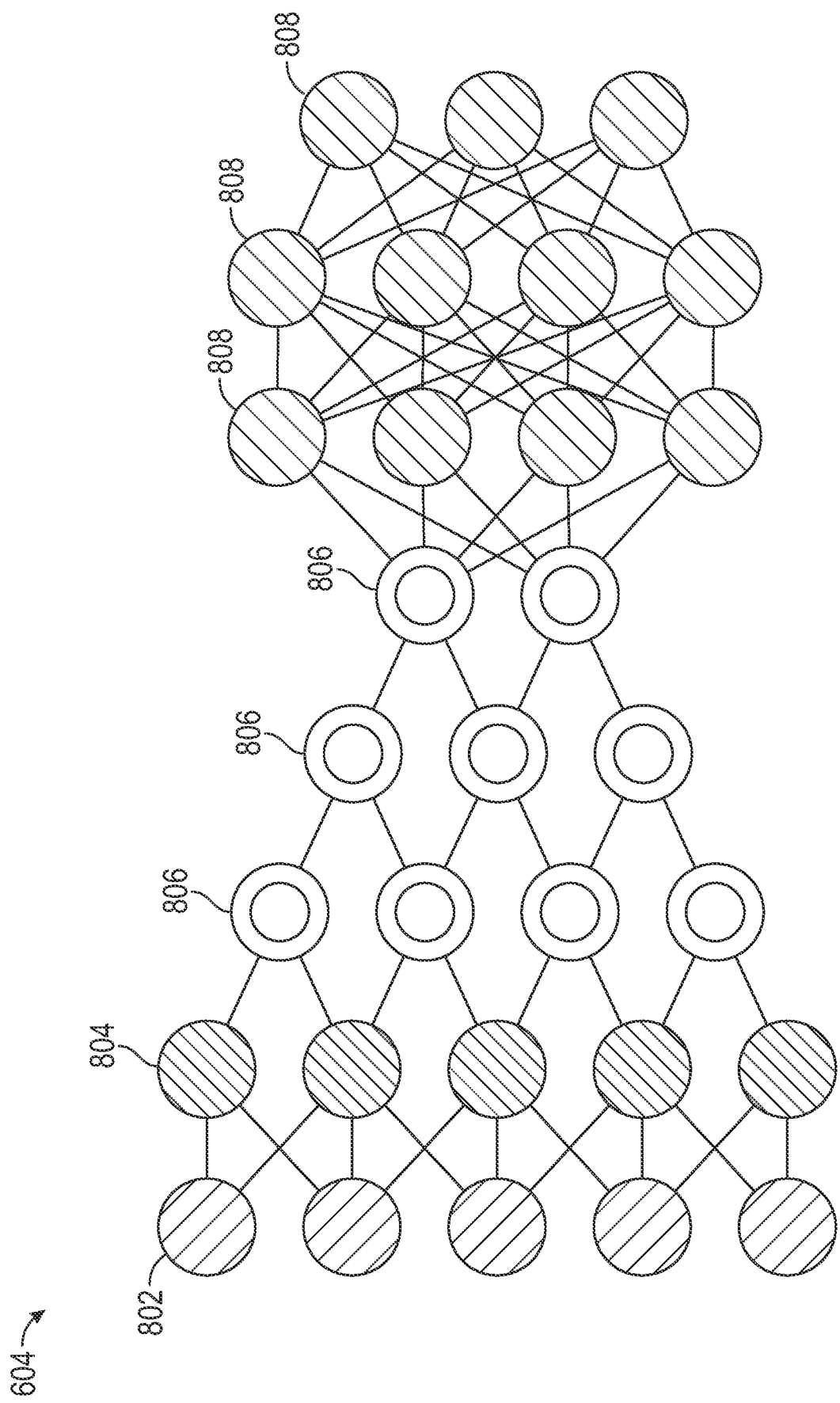
FIG. 8 is a pictorial representation of a convolutional neural network.

Referring to FIG. 8, there is shown a convolutional neural network (CNN) 604. Generally, a neural network includes input nodes (i.e., layers) 802, hidden nodes 804 and 806, and output nodes 808. CNN 804 is considered convolutional because hidden nodes 806 are convolution layers.

In some embodiments, a CNN 804 can be used for both feature extraction and object detection. In some embodiments, a first CNN 804 is used for feature extraction and a second CNN is used for object detection. In some embodiments, a CNN 804 used for feature extraction and a meta-architecture used for object detection is preferred. Example CNN architectures for feature extraction include MobileNet, VGGNet, Inception, Xception, Res-Net, and AlexNet.

Figure 9:
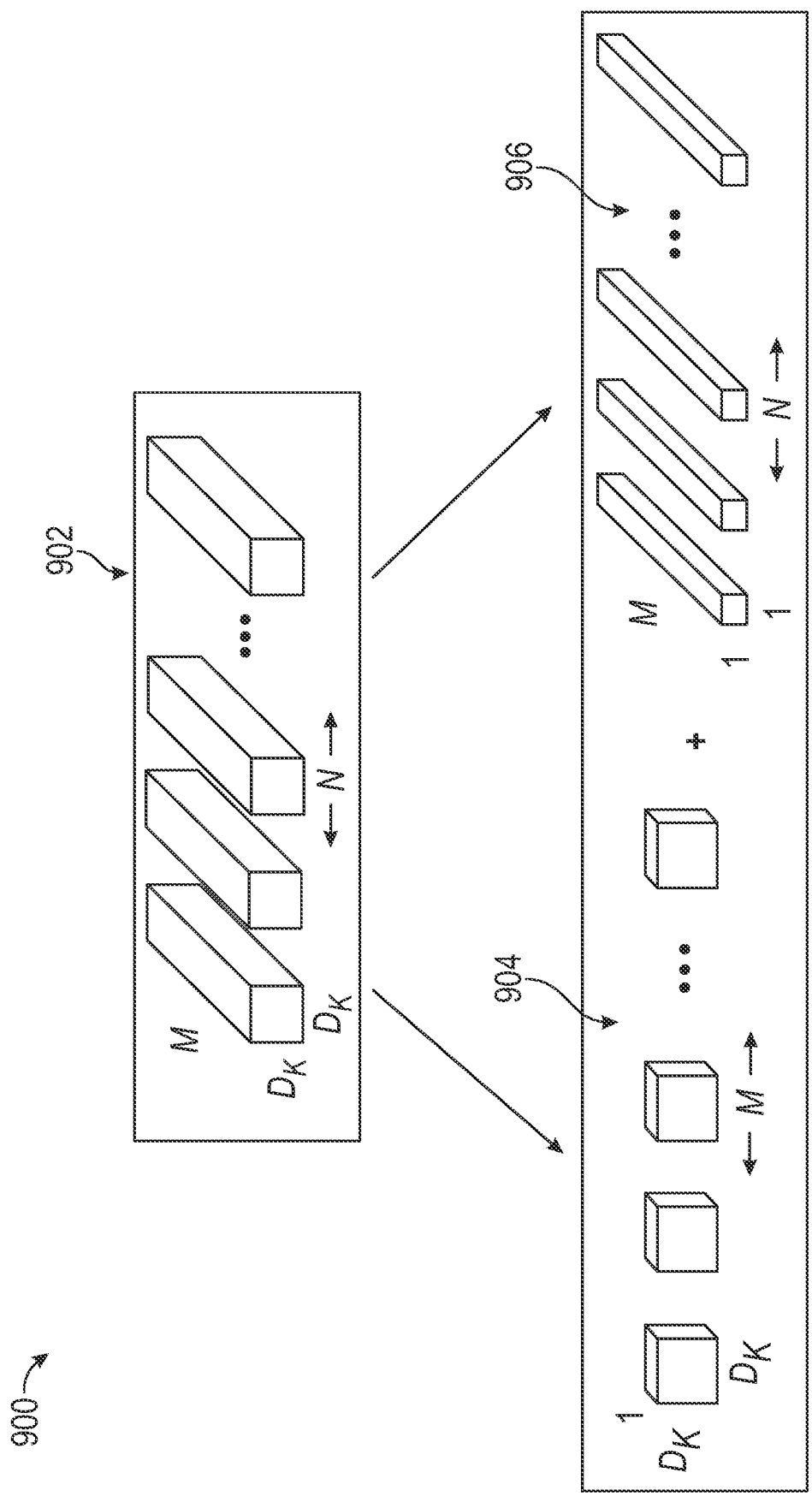
FIG. 9 is a pictorial representation of a depthwise separable convolution filter.

In some embodiments, the MobileNet architecture is preferred as a feature extractor. To perform feature extraction, the MobileNet architecture implements a depthwise separable convolution filter. Referring to FIG. 9, there is shown a pictorial representation of the depthwise separable convolution filter 900 (see Howard et al. in "MobileNets: Efficient Convolutional Neural Networks for Mobile Vision Applications"). Depthwise separable convolution filter 900 separates the standard convolution filter 902 into a depthwise convolution filter 904 and a pointwise convolution filter 906. This separation (i.e., factorization) of the depthwise convolution filter 904 and pointwise convolution filter 906 can significantly reduce the computational demands while incurring a relatively small decrease to the overall accuracy of the system.

Figure 10:
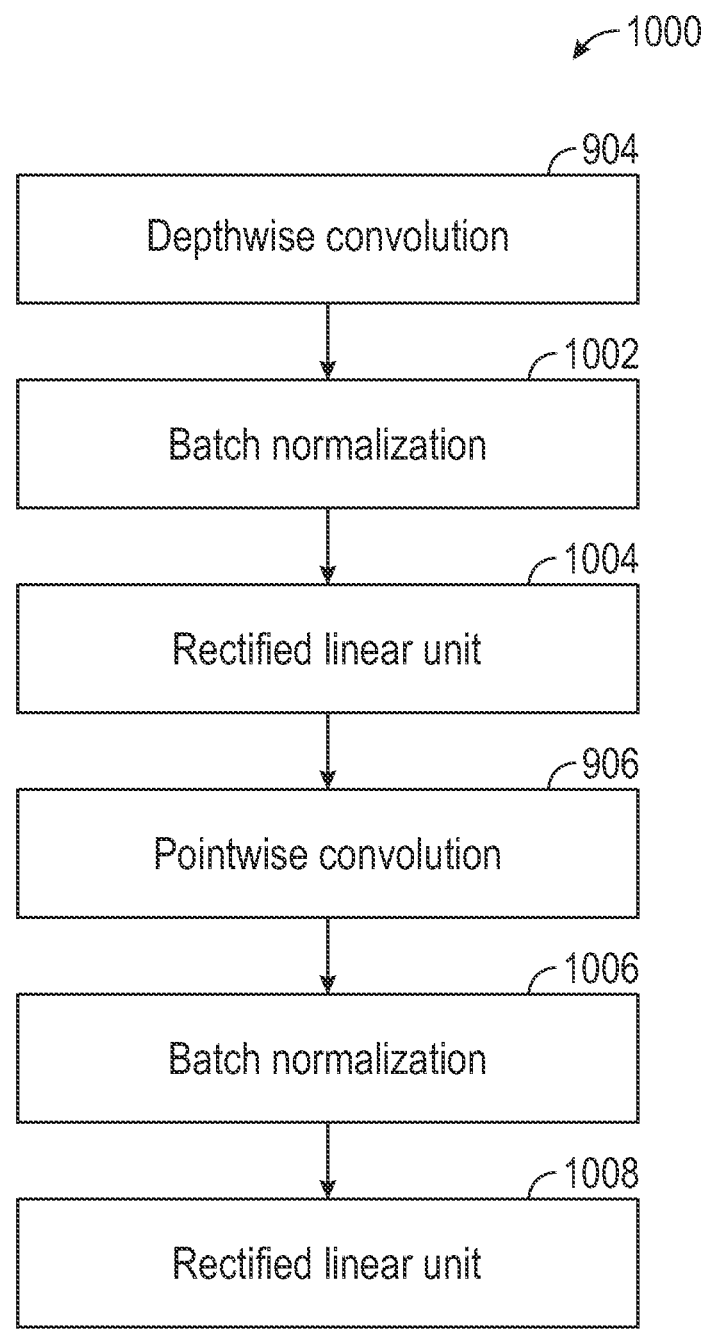
FIG. 10 is a pictorial representation of a depthwise separable convolution filter architecture with batch normalization and rectified linear unit activation.

Typically, a standard convolution filter 902 can be followed by a batch normalization (BN) and a rectified linear unit activation (RELU). With a depthwise separable convolution filter 900 in the MobileNet architecture, each of the depthwise convolution filter 904 and the pointwise convolution filter 906 are followed by a BN and a RELU Referring to FIG. 10, there is shown a pictorial representation of a depthwise separable convolution filter architecture 1000 with BN and RELU As shown in FIG. 10, the depthwise convolution filter 904 is followed by a first BN 1002 and a first RELU 1004. In addition, the pointwise convolution filter 906 followed by a second BN 1002 and a second RELU 1004.

Referring to FIG. 11, there is shown a full network structure for the MobileNet architecture (see Howard et al.). The first convolution layer 1102 is a standard convolution layer and not separated into a depthwise convolution layer and a pointwise convolution layer. After the first layer 1102, subsequent convolutions are separated. For example, layer 1104 is a depthwise convolution, which is indicated by "conv dw", and layer 1106 is the corresponding pointwise convolution, indicated by the first two dimensions of the filter shape being 1×1. Each convolution layer, such as 1102, 1104, and 1106 is followed by a BN and a RELU. The convolution layers are followed by an average pooling layer 1008, a fully connected layer 1110, and a Softmax classifier 1112. The full network consists of 28 layers when the depthwise and pointwise convolutions are counted as separate layers.

The complexity of the MobileNet architecture can be controlled by two hyperparameters: (i) a width multiplier, and (ii) a resolution multiplier. The width multiplier enables the construction of a smaller and faster network by modifying the thinness of each layer in the network uniformly. In particular, the width multiplier scales the number of depthwise convolutions and the number of outputs generated by the pointwise convolutions. While the smaller network can reduce the computational cost, it can also reduce the accuracy of the network. The width multiplier can be any value between greater than 0 and less than or equal to 1. As the width multiplier decreases, the network becomes smaller. In some embodiments, a width multiplier of 1 is preferred as it corresponds to a network with greatest accuracy.

The resolution multiplier enables the construction of a network with reduced computational cost by scaling the resolution of the input image, which in turn, reduces the resolution of a subsequent feature map layer. Although the reduced resolution can reduce the computational cost, it can reduce the accuracy of the network as well. The resolution multiplier can be any value between greater than 0 and less than or equal to 1. In some embodiments, a resolution multiplier of 1 is preferred as it corresponds to a network having greatest accuracy.

When the width multiplier and resolution multiplier each have a value of 1, the MobileNet architecture can be referred to as being non-scaled. That is, the MobileNet architecture as shown in FIG. 11 is implemented. Furthermore, the MobileNet architecture can be implemented in Python™ programming language with the Tensorflow™ application programming interface (API) by Google®.

In some embodiments, the known meta-architecture is used for object detection based on features extracted by the MobileNet architecture. In particular, the known meta-architecture can perform bounding box regression and classification. In some aspects, the known meta-architecture can be any one of a Faster Region-based CNNs (R-CNN), a Region-based Fully Convolutional Network (R-FCN), or a single shot detection (SSD).

In some embodiments, a MobileNet architecture in conjunction with SSD is preferred because it can offer low latency. In addition, R-CNN and R-FCN would require training of an additional CNN while SSD does not. SSD can use the base feature extractor and some additional convolution filters (i.e., convolution kernels) to perform bounding box regression and classification. That is, SSD can use small convolution filters applied to a set of feature map outputs (i.e., outputs from convolution layers within the feature extractor or output from convolution layers added to the feature extractor) to predict a class label, a class confidence score, and bounding box pixel coordinates for each bounding box of a set of default bounding boxes defined during training. Training of the CNN will be described in further detail below.

Each bounding box can be filtered based on the class confidence score predicted for that bounding box. That is, bounding boxes having a predicted class confidence score greater than a pre-defined confidence threshold of acceptability can be retained for further processing. Bounding boxes having a predicted class confidence score less than or equal to the confidence threshold of acceptability can be rejected and not subject to further processing. Any appropriate confidence threshold of acceptability can be used. In some embodiments, a confidence threshold of 0.01 is preferred.

Non-maxima suppression can be applied to retained bounding boxes to merge bounding boxes having like class labels and an overlap into a single bounding box. In some embodiments, a measure of the overlap between two bounding boxes must satisfy a pre-defined threshold in order to be merged. That is, bounding boxes must share a pre-defined threshold of similarity in order to be merged. In some embodiments, a Jaccard index (i.e., Intersection over Union ("IoU")) can be used as a measure of the overlap. In some embodiments, a pre-defined threshold for the Jaccard index of about 0.5 is preferred. For example, two bounding boxes having the same class label and an IoU of 0.6 would be merged. However, two bounding boxes having the same class label and an IoU of 0.4 would not be merged.

In some embodiments, a pre-defined upper limit of bounding boxes can be used. That is, if the number of bounding boxes remaining for a single image after non-maxima suppression is greater than the pre-defined upper limit of bounding boxes, the bounding boxes can be sorted in order of decreasing class confidence scores. The top bounding boxes having the greatest class confidence scores, up to the pre-defined upper limit, can be retained for further processing. In some embodiments, a pre-defined upper limit of bounding boxes of 200 is preferred. The pixel coordinates of the bounding boxes within the pre-defined upper limit of bounding boxes can be provided to the processor 602.

The processor 604 can be configured to select an action to take, based on whether the object candidate is acceptable. In some embodiments, the object candidate can be used for further processing. Further processing can include more detailed identification of the waste receptacle, more refined location of the waste receptacle within the bounding box, and calculating the location of the waste receptacle. In some embodiments, detailed identification of the waste receptacle can include identifying a specific waste receptacle and/or identifying a specific waste receptacle model.

In some embodiments, the object candidate can be used for picking up the waste receptacle and dumping the contents of the waste receptacle into a collection bin. In some embodiments, the object candidate can be used for moving a divider into a position that guides the contents of the waste receptacle into an appropriate collection bin. In some embodiments, the object candidate can be rejected if it is not acceptable. When an object candidate is rejected, it will not be subject to further processing. In some embodiments, the selected action can include actions for the processor 604, the arm-actuation module 106, the arm 108, the divider actuation module, the divider, and/or other devices.

For an example of object detection (i.e., bounding box regression and classification) using SSD, each feature map can have two sets of K convolution blocks derived from convolution filters, where K represents the hyperparameter that specifies the number of default bounding boxes. Each of the small convolution filters can have a size of 3×3×P, wherein P represents the number of channels for that feature map. The first convolution filter results in a first set of K convolutional blocks that relate to the localization point of a bounding box. That is, the first set of K convolution blocks can include four layers each, one layer for each localization point (x, y, w, h) of the bounding box. The second convolution filter results in a second set of K convolutional blocks that relate to the number of classes (i.e., waste collection streams). That is, the second set of K convolution blocks can include C+1 layers each, where C is the number of classes (i.e., garbage, recycling, compost) with an additional layer for the background.

Figure 12:
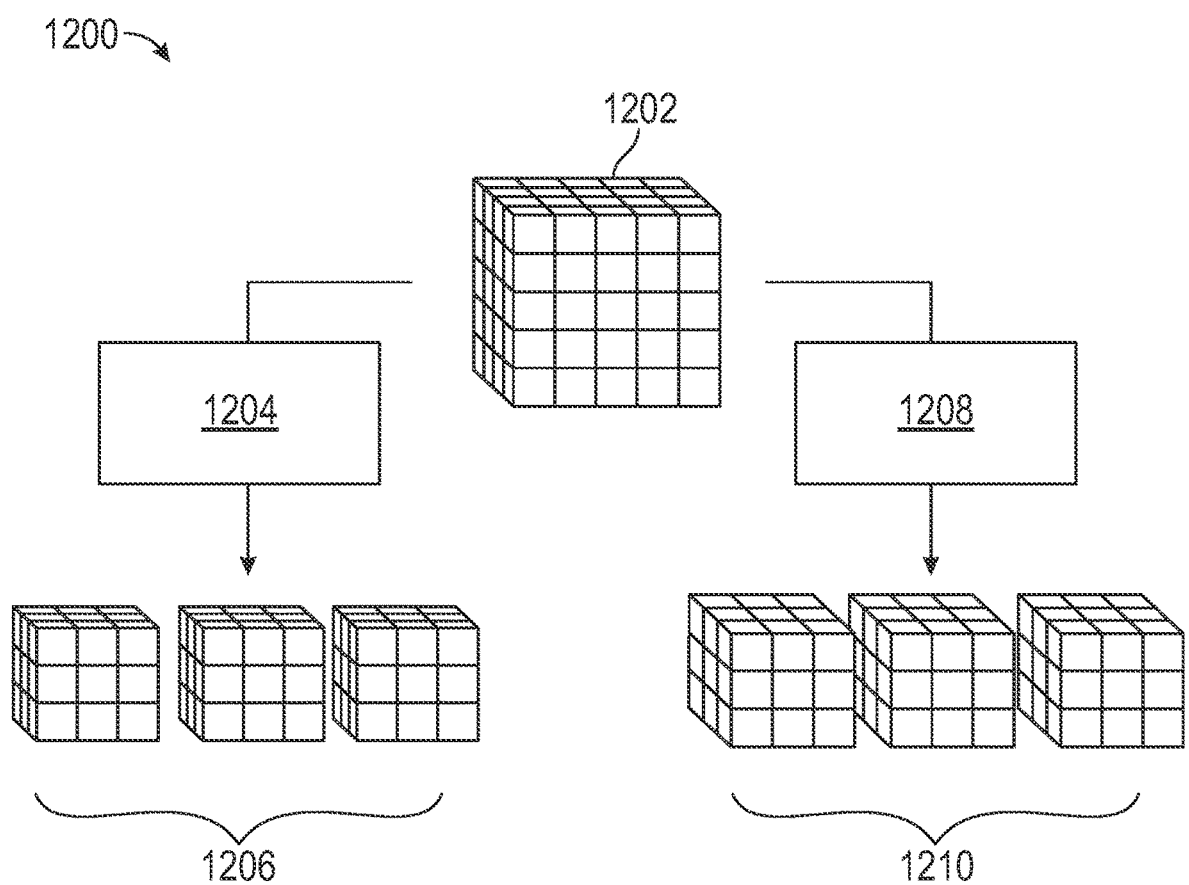
FIG. 12 is pictorial representation of a single shot detector implementation.

Referring now to FIG. 12, shown therein is an example SSD implementation using a single feature map 1202, 3 default bounding boxes, 4 localization points, and 8 classes. Since feature map 1202 has a size of 5×5×7, it has 7 channels. A first convolution filter 1204, having a size of 3×3×7, is applied to the output of the feature map 1202. This results in 3 localization blocks 1206, which have a size of 3×3×4. A second convolution filter 1208, having a size of 3×3×7, is also applied to the output of the feature map 1202. This results in 3 classification blocks 1210, which have a size of 3×3×9.

The number of feature maps and the number of default bounding boxes used in the SSD meta-architecture are hyperparameters. The number and the size of the default bounding boxes, as defined by the meta-architecture, can be redefined during training by hyperparameters. Default bounding boxes can be defined in size based on an aspect ratio and a scale range. In some embodiments, six default bounding boxes having aspect ratios of {1, 2, 3, ½, ⅓} and a scale range of about 0.2 to about 0.9 can be used. In some embodiments, the feature maps chosen from the MobileNet architecture were conv 11 and conv 13, and four convolution layers were added with decaying resolution with depths of 512, 256, 256, 128 respectively. Decaying resolution can allow the network to find objects at various image scales.

Training CNN 604 can involve three general stages: preparing a network, preparing data, and training the network using the prepared data. To prepare the network, the feature extractor is loaded on processor 602 and trained using a first dataset. In some embodiments, when the MobileNet architecture is used as the feature extractor, the MobileNet architecture is trained using a dataset for training algorithms on object classification, such as the ImageNet-CLS dataset.

When the MobileNet architecture is used in conjunction with SSD for object detection, the classification layer of the MobileNet architecture can be removed since SSD can perform the classification.

Figure 13:
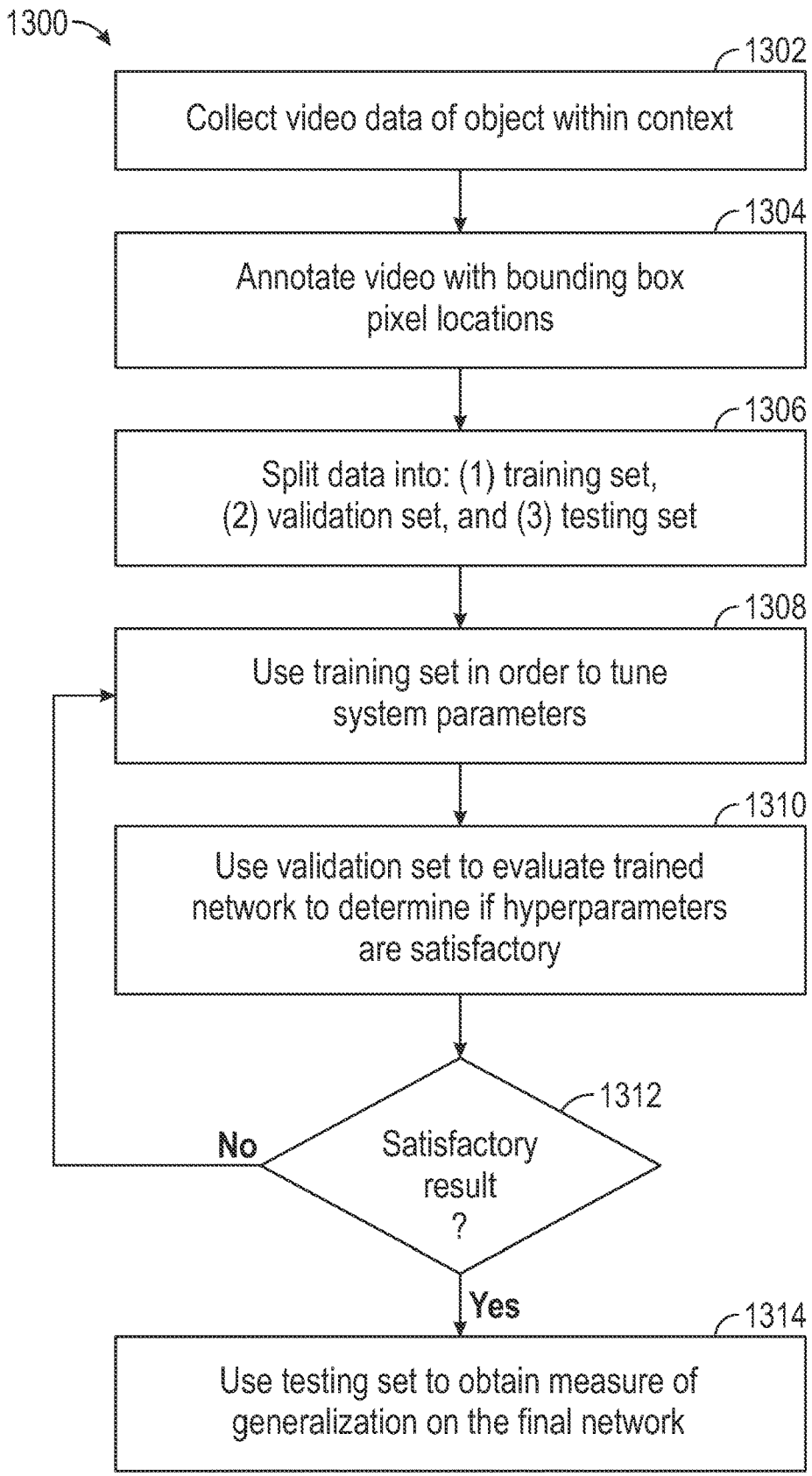
FIG. 13 is a flow diagram depicting a method for training a convolutional neural network.

Referring to FIG. 13, there is shown a method 1300 for training CNN 602. The method begins at step 1302, when video data of the object within context is collected. As described above, video frames can be extracted to obtain images. At step 1304, the images are then annotated with default bounding boxes. Images are annotated with bounding boxes, which form the "ground truth bounding boxes" for training the CNN. Ground truth bounding boxes can be used during training as a positive example. In some embodiments, a measure of overlap between a ground truth bounding box and a default bounding box, as defined by the meta-architecture, can be determined. If the measure of overlap satisfies the pre-defined threshold of similarity, then the ground truth bounding box can be regarded during training as a positive example.

In some embodiments, step 1304 can also involve artificially expanding the dataset. The dataset can be artificially expended by adding random noise to the pixels. Next, at step 1306, the data is divided into three data sets: training, validation, and testing.

At step 1308, training of the network using the prepared data set begins. When MobileNet is used in conjunction with SSD, step 1308 involves using the training data (i.e., positive examples) in order to tune system parameters. More specifically, the training data is provided to the network (i.e., feed forward). The network makes a predictions based on the training data. There are other ways to tune the system parameters by performing min-batch gradient descent.

Each example data has the potential to be a mistake; the magnitude of each mistake can be determined by a network loss function. The derivative of the network loss function corresponds to how much adjustment the network requires, based on the example data. The loss value is then back-propagated through the network to determine at various neurons (i.e., weight and biases). Each neuron has a set of parameters (i.e., weight and biases) that get updated by these derivatives of the gradient (derivative). However, the longer it takes, a likely perform mini-batch gradient descent on the network loss function and then back-propagate the loss functions error to tune system parameters.

At step 1310, the validation data set is used to evaluate whether hyperparameters (i.e., width multiplier, resolution multiplier, number of default bounding boxes, size of default bounding boxes, and number of feature maps) of the network trained in step 1308 are satisfactory. At step 1312, the hyperparameters can be considered satisfactory based on at least one of the accuracy and the latency of the prediction obtained when the validation data set is applied to the network. In some embodiments, the hyperparameters can be considered satisfactory based on a pre-defined processing rate threshold. For example, the hyperparameters can be considered satisfactory when the system is able to process at least about 10 frames per second.

If the hyperparameters are not satisfactory, the method returns to step 1308, and repeats steps 1308 and 1310 until a satisfactory result is obtained at step 1312.

If the hyperparameters are satisfactory, the method proceeds to step 1314. At step 1314, the testing set is applied to the network finalized in step 1312 in order to obtain a measure of generalization.

Figure 14:
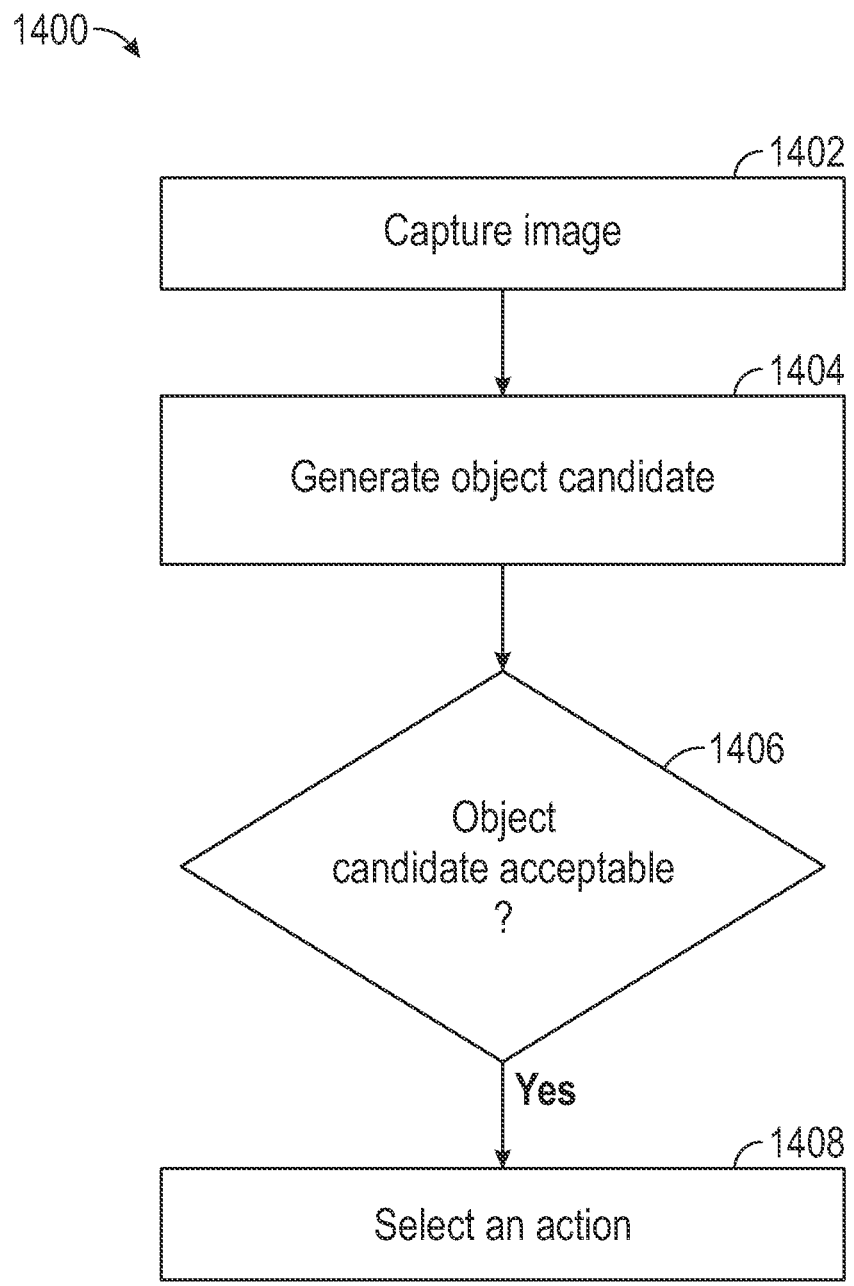
FIG. 14 is a flow diagram depicting a method for detecting a waste receptacle.

Referring to FIG. 14, there is shown a method 1400 for detecting and picking up a waste receptacle. The method 1400 begins at step 1402, when images of an object are captured. The image may be captured by the camera 104, mounted on a waste-collection vehicle 102 as it is driven along a path.

At step 1404, the image is analyzed to generate an object candidate.

At step 1406, the object candidate is analyzed to determine whether the object candidate is acceptable. The determination of an acceptable object candidate can be based on the class confidence score. If the class confidence score is greater than a pre-defined threshold of acceptability, then the object candidate is determined to be acceptable. If the class confidence score is not greater than the pre-defined threshold of acceptability, then the object candidate is determined to be unacceptable. If the object candidate is determined to be acceptable, the method proceeds to step 1408.

At step 1408, an action is selected. When the object candidate is not acceptable, the action can be rejecting the object candidate. When an object candidate is rejected, the method 1400 can terminate without further processing of the object candidate. Once the method 1400 terminates, another iteration of the method 1400 can begin with capturing a new image at step 1402.

When the object candidate is acceptable, various actions can be selected. In some embodiments, the action selected can be picking up the waste receptacle. When the action of picking up the waste receptacle is selected, a location of the waste receptacle can be calculated based on the image.

Also, when the waste-collection vehicle is a multiple-stream collection vehicle having a divider for directing contents into one of the various collection bin, a selected action can include moving the position of the divider based on the object candidate of the waste receptacle.

Once the divider has been moved into the appropriate position, the arm can be moved to pick up the waste receptacle. In some embodiments, the waste receptacle can be picked up by grasping the waste receptacle. In some embodiments, moving the arm involves lifting the waste receptacle and dumping the contents of the waste receptacle into the collection bin.

In some embodiments, when a divider is not provided in a multiple-stream collection vehicle, a location of the corresponding collection bin of the waste-collection vehicle can be determined based on the object classification of the object candidate. In such cases, moving the arm involves lifting the waste receptacle and moving the arm to the appropriate collection bin based on the object classification.

After the contents of the waste receptacle are dumped into the collection bin, the method 1400 can terminate. When the method 1400 terminates, another iteration of the method 1400 can begin with capturing a new image at step 1402.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

What is claimed is:

1. A system for detecting a waste receptacle, comprising:
   a camera configured to capture an image;
   a convolutional neural network trained for identifying waste receptacles, the convolutional neural network comprising a plurality of depthwise separable convolution filters and a MobileNet architecture; and
   one or more processors in communication with a waste-collection vehicle, the camera, and the convolutional neural network, the one or more processors configured to:
      determine, based on use of the convolutional neural network, whether the image includes the waste receptacle; and
      determine, based on whether the image includes the waste receptacle, an action.

2. The system of claim 1, wherein determining, based on use of the convolutional neural network, whether the image includes the waste receptacle comprises predicting an object classification and a bounding box based on the image.

3. The system of claim 2, wherein determining, based on use of the convolutional neural network, whether the image includes the waste receptacle further includes:
   predicting, using the bounding box, a class confidence score; and
   if the class confidence score is greater than a pre-defined confidence threshold of acceptability, determining that the image includes the waste receptacle;
   otherwise determining that the waste receptacle is absent from the image.

4. The system of claim 2, wherein the object classification comprises at least one of garbage, recycling, compost, and background.

5. The system of claim 2, wherein the bounding box comprises pixel coordinates, a bounding box width, and a bounding box height.

6. The system of claim 1, wherein the convolutional neural network comprises a meta-architecture for object classification and bounding box regression.

7. The system of claim 6, wherein the meta-architecture comprises single shot detection.

8. The system of claim 7, wherein the meta-architecture comprises four additional convolution layers.

9. The system of claim 1, further comprising:
   an arm for grasping the waste receptacle, the arm being mountable on the waste-collection vehicle; and
   an arm-actuation module connected to the arm, the arm-actuation module in communication with the one or more processors;
   wherein the one or more processors are further configured to:
      select the action of picking up the waste receptacle if the image includes the waste receptacle;
      select the action of rejecting an object included in the image; and
      if the action of picking up the waste receptacle is selected, calculating a location of the waste receptacle; and
   wherein the arm-actuation module is configured to automatically move the arm in response to the location of the waste receptacle.

10. The system of claim 9, wherein the arm-actuation module is configured so that automatically moving the arm comprises grasping the waste receptacle.

11. The system of claim 10, wherein moving the arm further comprises lifting the waste receptacle and dumping contents of the waste receptacle into the waste-collection vehicle.

12. A method for detecting a waste receptacle, comprising:
   capturing an image with a camera;
   determining, by one or more processors using a convolutional neural network, whether the image includes the waste receptacle, wherein the convolutional neural network comprises a plurality of depthwise separable convolution filters and a MobileNet architecture; and
   determining, by the one or more processors, an action based on whether the image includes the waste receptacle.

13. The method of claim 12, wherein determining, by the one or more processors using the convolutional neural network, whether the image includes the waste receptacle comprises predicting an object classification and a bounding box based on the image.

14. The method of claim 13, wherein determining, by the one or more processors using the convolutional neural network, whether the image includes the waste receptacle further includes:
   predicting, using the bounding box, a class confidence score; and
   if the class confidence score is greater than a pre-defined confidence threshold of acceptability, determining that the image includes the waste receptacle;
   otherwise determining that the waste receptacle is absent from the image.

15. The method of claim 13, wherein the object classification comprises at least one of garbage, recycling, compost, or background.

16. The method of claim 13, wherein the bounding box comprises pixel coordinates, a bounding box width, and a bounding box height.

17. The method of claim 12, wherein the convolutional neural network comprises a meta-architecture for object classification and bounding box regression.

18. The method of claim 17, wherein the meta-architecture comprises single shot detection.

19. The method of claim 18, wherein the meta-architecture comprises four additional convolution layers.

20. The method of claim 12, wherein determining the action based on whether the image includes the waste receptacle comprises:
   selecting the action of picking up the waste receptacle if the image includes the waste receptacle; and
   selecting the action of rejecting an object included in the image; and
   if the action of picking up the waste receptacle is performed, the method further comprises:
      calculating a location of the waste receptacle; and
      moving an arm mounted on a waste-collection vehicle in response to the location of the waste receptacle.

21. The method of claim 20, wherein moving the arm comprises grasping the waste receptacle.

22. The method of claim 21, wherein moving the arm further comprises lifting the waste receptacle and dumping contents of the waste receptacle into the waste-collection vehicle.

23. A system for detecting a waste receptacle, comprising:
   a camera configured to capture an image;
   a convolutional neural network trained for identifying waste receptacles, the convolutional neural network comprising a plurality of depthwise separable convolution filters and a meta-architecture for object classification and bounding box regression; and
   one or more processors in communication with a waste-collection vehicle, the camera, and the convolutional neural network, the one or more processors configured to:
      determine, based on use of the convolutional neural network, whether the image includes the waste receptacle; and
      determine, based on whether the image includes the waste receptacle, an action.

* * * * *